US012713130B1

(12) United States Patent
Yang et al.

(10) Patent No.: US 12,713,130 B1
(45) Date of Patent: Aug. 18, 2026

(54) GIMBAL AND SHAPE MEMORY ALLOY ACTUATOR FOR CAMERA

(71) Applicant: Apple Inc., Cupertino, CA (US)

(72) Inventors: Qiang Yang, Fremont, CA (US); Yu-Min Lee, Saratoga, CA (US); Aurelien R Hubert, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 18/473,117

(22) Filed: Sep. 22, 2023

(51) Int. Cl.

| | |
|---|---|
| ***H04N 23/68*** | (2023.01) |
| ***G03B 13/36*** | (2021.01) |
| ***H04N 23/54*** | (2023.01) |
| ***H04N 23/67*** | (2023.01) |

(52) U.S. Cl.
CPC ........... *H04N 23/687* (2023.01); *G03B 13/36* (2013.01); *H04N 23/54* (2023.01); *H04N 23/67* (2023.01)

(58) Field of Classification Search
CPC ...... H04N 23/687; H04N 23/54; H04N 23/67; G03B 13/36
See application file for complete search history.

(56) References Cited

U.S. PATENT DOCUMENTS

| | | | | |
|---|---|---|---|---|
| 9,910,291 | B2 | 3/2018 | Kim et al. | |
| 10,310,290 | B2 | 6/2019 | Yu et al. | |
| 10,330,886 | B2 | 6/2019 | Shim et al. | |
| 2009/0103194 | A1 | 4/2009 | Chen | |
| 2014/0009631 | A1 | 1/2014 | Topliss | |
| 2015/0365568 | A1* | 12/2015 | Topliss | H04N 23/50 348/360 |
| 2018/0063438 | A1 | 3/2018 | Miller et al. | |
| 2018/0367711 | A1* | 12/2018 | Topliss | H04N 23/50 |
| 2019/0196300 | A1 | 6/2019 | Kim et al. | |
| 2021/0072494 | A1 | 3/2021 | Zhu et al. | |
| 2021/0294069 | A1* | 9/2021 | Miller | G02B 7/09 |
| 2023/0128842 | A1 | 4/2023 | Lee | |

(Continued)

FOREIGN PATENT DOCUMENTS

| | | | |
|---|---|---|---|
| CN | 212658927 | U | 3/2021 |
| CN | 218958770 | U | 5/2023 |

(Continued)

OTHER PUBLICATIONS

U.S. Appl. No. 19/315,223, filed Aug. 29, 2025, Andrew J. Jozefov, et al.

(Continued)

*Primary Examiner* — Gevell V Selby
(74) *Attorney, Agent, or Firm* — Robert C. Kowert; Kowert, Hood, Munyon, Rankin & Goetzel, P.C.

(57) ABSTRACT

Various embodiments include a camera system that includes an actuator arrangement that enables autofocus (AF) and/or optical image stabilization (OIS) motion. In various embodiments, the actuator arrangement may include one or more shape memory alloy (SMA) actuators. For example, the camera system may include an AF SMA actuator comprising a plurality of SMA wires configured to move a lens group of the camera system, relative to an image sensor of the camera system, in directions parallel to an optical axis. In some embodiments, the camera system may include an OIS actuator configured to tilt the lens group, together with the image sensor, about multiple axes orthogonal to the optical axis.

17 Claims, 23 Drawing Sheets

(56) References Cited

U.S. PATENT DOCUMENTS

| | | | | |
|---|---|---|---|---|
| 2023/0161226 | A1* | 5/2023 | Bunting | H04N 23/55 359/696 |
| 2023/0199313 | A1 | 6/2023 | Hubert et al. | |
| 2024/0040254 | A1 | 2/2024 | Kim et al. | |
| 2024/0142856 | A1 | 5/2024 | Kim et al. | |
| 2024/0271605 | A1* | 8/2024 | Easton | G02B 27/646 |

FOREIGN PATENT DOCUMENTS

| | | | |
|---|---|---|---|
| CN | 114500776 | B | 3/2024 |
| KR | 20240037817 | A | 3/2024 |
| KR | 20240057273 | A | 5/2024 |
| TW | 200916872 | | 4/2009 |
| TW | 200921259 | | 5/2009 |
| WO | 2023231849 | | 7/2023 |
| WO | 2024014714 | A1 | 1/2024 |
| WO | 2024025071 | A1 | 2/2024 |

OTHER PUBLICATIONS

U.S. Appl. No. 19/315,209, filed Aug. 29, 2025, Andrew J. Jozefov, et al.

U.S. Appl. No. 18/583,692, filed Feb. 21, 2024, Alfred N. Mireault, et al.

* cited by examiner

GIMBAL AND SHAPE MEMORY ALLOY ACTUATOR FOR CAMERA

BACKGROUND

Technical Field

This disclosure relates generally to a camera that includes an actuator arrangement that enables autofocus (AF) and/or optical image stabilization (OIS) motion. In various embodiments, the actuator arrangement includes one or more shape memory alloy (SMA) actuators.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 1A shows a schematic cross-sectional side view of the camera system. FIG. 1B shows a schematic top view of a portion of the camera system.

FIG. 1C shows a schematic side view of a portion of the camera system. FIG. 1D shows a schematic side view of another portion of the camera system.

FIG. 2A shows a top view of the camera system. FIG. 2B shows a cross-sectional side view of the camera system, taken at section line 2B-2B indicated in FIG. 2A. FIG. 2C shows a cross-sectional side view of the camera system, taken at section line 2C-2C indicated in FIG. 2A.

FIG. 3A shows a perspective view of example camera components including a substrate coupled with a coil holder. FIG. 3B shows a top view of example camera components including the substrate.

FIG. 4A shows a top view of a substrate and autofocus (AF) position sensors coupled therewith.

FIG. 4B shows a cross-sectional perspective view of a portion of the substrate and a portion of a lens carrier (with AF sensing magnets coupled therewith). FIG. 4C shows a top view of the substrate and optical image stabilization (OIS) position sensors coupled therewith. FIG. 4D shows a partial cross-sectional side view of the substrate (with an OIS position sensor coupled therewith) and a drive magnet.

FIG. 5A shows a perspective view of an example actuator arrangement that may be included in the camera system. In various embodiments, the actuator arrangement may include SMA actuator(s) and/or one or more voice coil motor (VCM) actuators. FIG. 5B shows a portion of an example suspension arrangement that may be included in the camera system, and that may be used, e.g., to suspend the lens and enable AF motion. FIG. 5C shows a portion of the suspension arrangement that may be used, e.g., to suspend the lens and the image sensor and enable OIS motion.

FIG. 6A shows a perspective view of the camera components including SMA wires of the AF SMA actuator. FIG. 6B shows a top view of a portion of the camera components including example AF SMA actuation electrical paths.

FIG. 7A shows a perspective view of the camera components including electromagnetic components of the OIS VCM actuator. FIG. 7B shows a top view of a portion of the camera components including example OIS VCM actuation electrical paths.

FIG. 8A shows a cross-sectional top view of a portion of an AF bottom end stop. FIG. 8B shows a cross-sectional bottom view of another portion of the AF bottom end stop. FIG. 8C shows a cross-sectional top view of an AF top end stop.

FIG. 8D shows a cross-sectional perspective view of the AF top end stop.

FIG. 9A shows a cross-sectional top view of a portion of an OIS top end stop. FIG. 9B shows a cross-sectional bottom view of another portion of the OIS top end stop. FIG. 9C shows a cross-sectional perspective view of at least a portion of an OIS bottom end stop.

FIG. 11A shows a cross-sectional side view of the camera system. FIG. 11B shows another cross-sectional side view of the camera system. In some embodiments, the camera system may include a ball bearing suspension arrangement.

FIG. 12A shows a cross-sectional side view of the camera system. FIG. 12B shows another cross-sectional side view of the camera system. In some embodiments, the camera system may include an AF SMA actuator and an OIS SMA actuator.

Figure 1A:
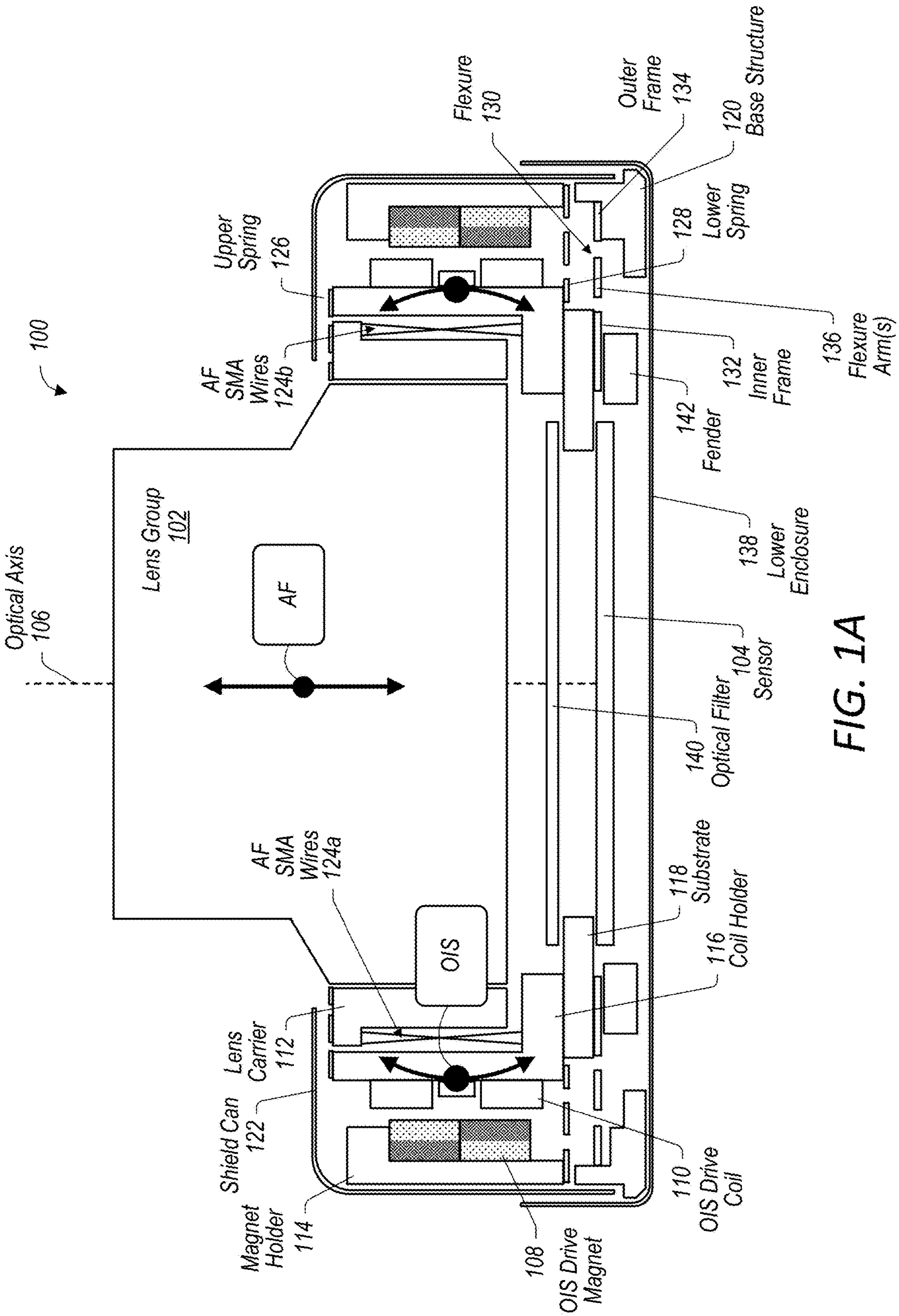
FIGS. 1A-1D illustrate views of an example camera system that may include one or more shape memory alloy (SMA) actuators, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by the se terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a camera system that includes an actuator arrangement that enables autofocus (AF) and/or optical image stabilization (OIS) motion. In various embodiments, the actuator arrangement includes one or more shape memory alloy (SMA) actuators. For example, in some embodiments, the camera system may include an AF SMA actuator and an OIS voice coil motor (VCM) actuator. The AF SMA actuator may include a plurality of SMA wires configured to move a lens group of the camera system, relative to an image sensor of the camera system, in directions parallel to an optical axis. The OIS VCM actuator may be configured to tilt the lens group, together with the image sensor, about multiple axes orthogonal to the optical axis.

In some other camera designs, OIS may be realized by shifting the lens group or the image sensor in a plane that is orthogonal to the optical axis, e.g., in order to counter movement such as that caused by a hand shaking. Embodiments described in the present disclosure, on the other hand, include a gimbal OIS actuator design that rotates the lens group and the image sensor together to compensate for jerky motion and may achieve more efficient stabilization compared to the lens shift or image sensor shift designs of other camera designs. Gimbal OIS actuation may enable improved user experiences, including, but not limited to, zero perspective distortion during smooth pan video recording, 4K action mode with true stabilization, better image corner sharpness in low-light photography, etc.

Embodiments of the camera system described herein may include a lens shift AF design that uses SMA technology to achieve a compact design. Furthermore, in embodiments in which the camera system includes an OIS VCM actuator, the OIS VCM actuator may have a fixed magnet design that may eliminate magnet co-exist issues. Furthermore, the OIS VCM actuator may have a dual pole magnet layout in some embodiments. In other embodiments, the OIS VCM actuator may have a single pole magnet layout.

According to some embodiments, the camera system may include an AF SMA actuator and an OIS SMA actuator. In some embodiments, the camera system may include one or more suspension arrangements. For example, the suspension arrangement(s) may include a spring suspension arrangement, a flexure suspension arrangement, and/or a ball bearing suspension arrangement.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1C:
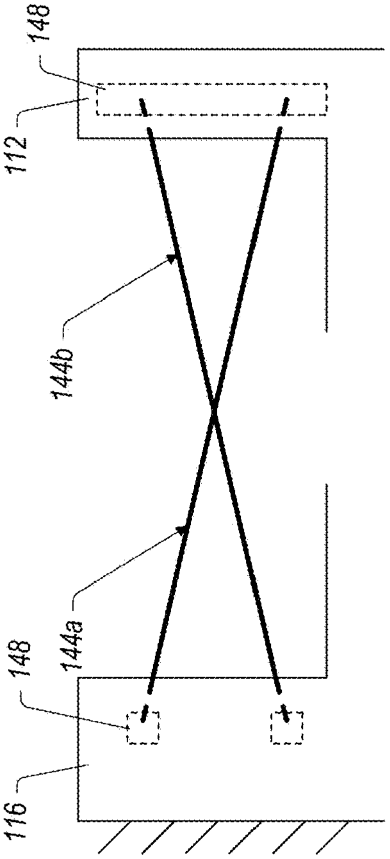
Figure 1D:
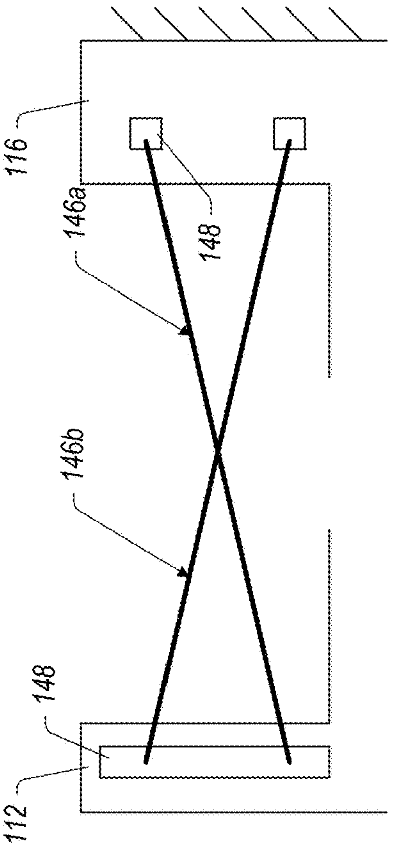
Figure 1B:
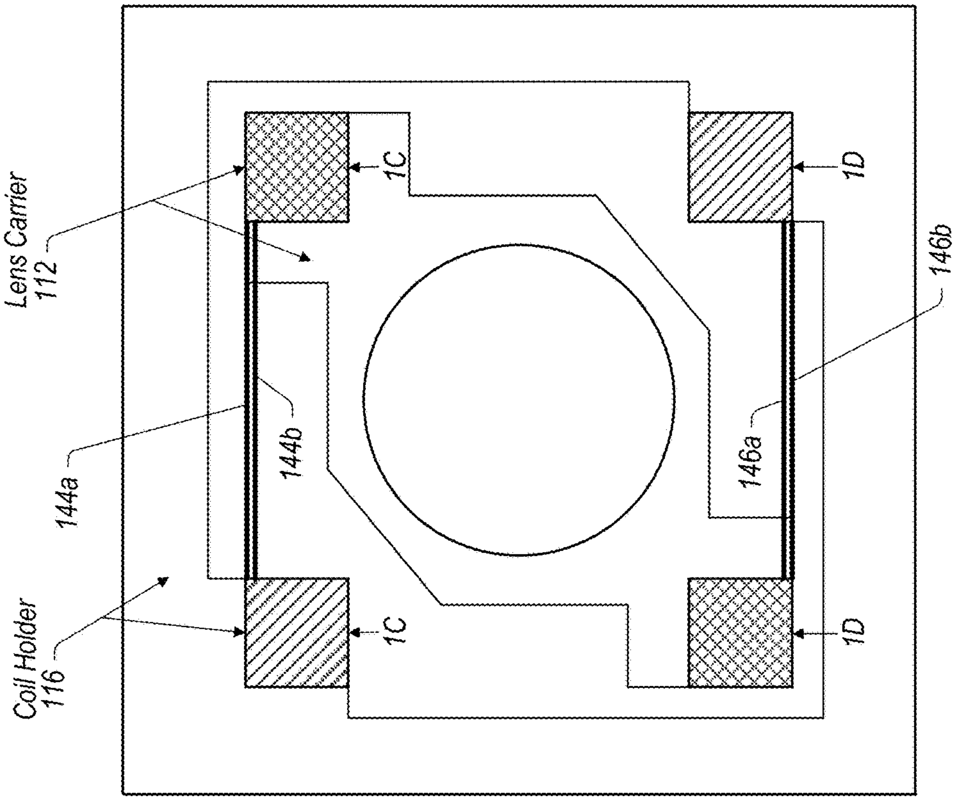

FIGS. 1A-1D illustrate views of an example camera system 100 that may include one or more shape memory alloy (SMA) actuators, in accordance with some embodiments. FIG. 1A shows a schematic cross-sectional side view of the camera system 100. FIG. 1B shows a schematic top view of a portion of the camera system 100. FIG. 1C shows a schematic side view of a portion of the camera system 100. FIG. 1D shows a schematic side view of another portion of the camera system 100.

In various embodiments, the camera system 100 may include a lens group 102, an image sensor 104, one or more actuator arrangements, and/or one or more suspension arrangements, e.g., as indicated in FIG. 1A. The actuator arrangement(s) may include an autofocus (AF) actuator and/or an optical image stabilization (OIS) actuator. In various embodiments, the AF actuator may be configured to move the lens group 102, relative to the image sensor 104, in directions parallel to an optical axis 106 of the camera system 100. Furthermore, the OIS actuator may be configured to tilt the lens group 102, together with the image sensor 104, about multiple axes orthogonal to the optical axis 106.

In some embodiments, the OIS actuator may comprise an OIS voice coil motor (VCM) actuator. As indicated in FIG. 1A, the OIS VCM actuator may include OIS drive magnets 108 and OIS drive coils 110. Furthermore, the camera system 100 may include a lens carrier 112, a magnet holder 114, a coil holder 116, a substrate 118, a base structure 120, and/or a shield can 122. As indicated in FIG. 1A, the image sensor 104 may be coupled with the substrate 118. Furthermore, the substrate 118 may be coupled with the coil holder 116, e.g., such that the image sensor 104 is movable together with the substrate 118 and the coil holder 116. In various embodiments, the magnet holder 114 may be coupled with the base structure 120 and/or the shield can 122. The magnet holder 114, the base structure 120, and the shield can 122 may be stationary components of the camera system 100 in various embodiments.

As previously mentioned, the OIS VCM actuator may include OIS drive magnets 108 (e.g., dual pole magnets) and OIS drive coils 110. The OIS drive magnets 108 may be coupled with the magnet holder 114. The OIS drive coils 110 may be coupled with the coil holder 116. In various embodiments, a respective OIS drive coil 110 may be positioned proximate a respective OIS drive magnet 108, e.g., such that, when driven with electric current, the respective OIS drive coil 110 is capable of electromagnetically interacting with the respective OIS drive magnet 108 to tilt the coil holder 116 (and the substrate 118 and image sensor 104 coupled therewith), together with the lens carrier 112 (and the lens group 102 coupled therewith), about multiple axes orthogonal to the optical axis 106. In this manner, the OIS VCM actuator may be configured to enable OIS tilt motion of the lens group 102 together with the image sensor 104.

It should be understood that the OIS actuator may additionally, or alternatively, include one or more other types of actuators. For example, as discussed in FIGS. 13A-13B, the OIS actuator may be an SMA OIS actuator in various embodiments.

According to various embodiments, the AF actuator may be an AF SMA actuator that includes SMA wires 124 configured to move the lens group 102, relative to the image sensor 104, in directions parallel to the optical axis 106. An SMA is an alloy that can be deformed when cold but returns to its pre-deformed ("remembered") shape when heated. In particular, the SMA wires 124 may be under tension and lengthened relative to their pre-deformed shape, and can be configured to retract to their shorter, pre-deformed shape when heated (e.g., via an electric current). The SMA wires 124 can be arranged in a particular manner such that certain ones of the SMA wires 124 can be heated (e.g., by running an electric current therethrough) to change their length and thereby move the lens carrier 112 upward or downward (directions parallel to the optical axis 106). In some non-limiting embodiments, the SMA wires 124 may be arranged in multiples on different sides of the camera system 100, to provide more stability as compared to an arrangement of a single wire on a side of the camera system 100.

As schematically indicated in FIG. 1A, according to some non-limiting embodiments, the SMA wires 124 may include a first pair of SMA wires **124*a* and a second pair of SMA wires 124*b*. The first pair of SMA wires 124*a* may be disposed proximate a first side of the camera system 100. The second pair of SMA wires 124*b* may be disposed proximate a second side of the camera system 100 opposite the first side. As will be discussed in further detail herein with reference to FIGS. 1B-1D, one pair of the SMA wires 124 may be used to enable upward movement of the lens carrier 112, and another pair of the SMA wires 124 may be used to enable downward movement of the lens carrier 112. It should be understood that the multiples of SMA wires at different sides of the camera system 100** is not limited to pairs of SMA wires, but rather may comprise fewer or more than two SMA wires in some embodiments.

In various embodiments, the suspension arrangement(s) of the camera system 100 may include a spring suspension arrangement and/or a flexure suspension arrangement. In some embodiments, the spring suspension arrangement may include an upper spring 126 and/or a lower spring 128.

In some embodiments, the upper spring 126 may be coupled with the lens carrier 112 and the coil holder 116. For example, a first portion of the upper spring 126 may be attached to the lens carrier 112, and a second portion of the upper spring 126 may be attached to the coil holder 116, as indicated in FIG. 1A. According to various embodiments, the upper spring 126 may suspend the lens group 102 from the coil holder 116 and allow motion of the lens group 102 and/or the image sensor 104 enabled by the actuator arrangement(s).

In some embodiments, the lower spring 128 may be coupled with the coil holder 116 and the magnet holder 114. For example, a first portion of the lower spring 128 may be attached to the coil holder 116 and a second portion of the lower spring 128 may be attached to the magnet holder 114, as indicated in FIG. 1A. According to various embodiments, the lower spring 128 may suspend the coil holder 116 from the magnet holder 114 and allow motion of the lens group 102 and the image sensor 104 enabled by the actuator arrangement(s).

According to some embodiments, the flexure suspension arrangement may include a flexure 130. In some non-limiting embodiments, the flexure 130 may include an inner frame 132, an outer frame 134, and one or more flexure arms 136 that extend from the inner frame 132 to the outer frame 134, e.g., as indicated in FIG. 1A. The inner frame 132 may be coupled with the substrate 118. The outer frame 134 may be coupled with one or more stationary structures (e.g., the base structure 120) of the camera system 100. In some embodiments, the flexure 130 and/or the flexure arm(s) 136 may be configured to provide sufficient stiffness to suspend the image sensor 104 from the stationary structure(s) and avoid undesired motion, while also providing sufficient compliance to enable intended motion caused by the OIS VCM actuator.

In some embodiments, the flexure 130 and/or the flexure arm(s) 136 may be used to route//convey electrical signals between components of the camera system 100. Such electrical signals may include, for example, image signals, power signals, and/or drive signals, etc. Electrical signals may be conveyed between the stationary component(s) (e.g., the base structure 120) and the image sensor 104 via the flexure 130 and the substrate 118 in some embodiments. For example, electrical signals may be conveyed from the stationary component(s) to the outer frame 134, then from the outer frame 134 to the inner frame 132 via electrical traces (not shown) on the flexure arm(s) 136, then from the inner frame 132 to the substrate 118, and then from the substrate 118 to the image sensor 104. The same path may be taken in reverse to convey electrical signals from the image sensor 104 to the stationary component(s) in some embodiments.

According to various embodiments, the camera system 100 may include a lower enclosure 138, an optical filter 140 (e.g., an infrared cut-off filter (IRCF)), and/or a fender 142. The shield can 122 and the lower enclosure 138 may encase at least a portion of the camera system 100. In some non-limiting embodiments, the shield can 122 may encase a first portion (e.g., an upper portion) and the lower enclosure 138 may encase a second portion (e.g., a lower portion). As indicated in FIG. 1A, a portion of the lower enclosure 138 may overlap with a portion of the shield can 122 in some embodiments.

The optical filter 140 may be coupled with the substrate 118. Furthermore, the optical filter 140 may be positioned above the image sensor 104, e.g., such that light passes through the optical filter 140 before it reaches the image sensor 104.

As will be discussed herein with reference to FIG. 9C, the fender 142 may form at least a portion of an end stop of the camera system 100. For example, the fender 142 and the lower enclosure 138 may form at least a portion of an OIS bottom end stop. The fender 142 may tilt/rotate during OIS actuation/motion, until the fender 142 reaches the lower enclosure 138, which stops the fender 142 from tilting any further in that direction.

As indicated in the schematic views shown in FIGS. 1B and 1C, the first pair of SMA wires 124*a* may include a respective first SMA wire 144*a* and a respective second SMA wire 144*b*. Furthermore, as indicated in the schematic views shown in FIGS. 1B and 1D, the second pair of SMA wires 124*b* may include a respective first SMA wire 146*a* and a respective second SMA wire 146*b*. Each end of the respective SMA wires 124 may be electrically coupled with either the lens carrier 112 or the coil holder 116 via an electrical connection 148 that may in turn be coupled with an electrical path/route (not shown in FIGS. 1A-1D, but see, e.g., FIGS. 6A-7B) that can convey an electrical current the electrical connection 148 and one or more other components (e.g., a driver coupled with the substrate 118).

As schematically shown in FIG. 1C, the first SMA wire 144*a* and the second SMA wire 144*b* of the first pair of SMA wires 124*a* may each be attached at one end to the coil holder 116 and at the other end to the lens carrier 112, in a criss-cross manner. Taking the left side connections of the wires in FIG. 1C, for example, the first SMA wire 144*a* may be connected to the coil holder 116 above the location at which the second SMA wire 144*b* is connected to the coil holder 116. Taking the right side connections of the wires in FIG. 1C, the first SMA wire 144*a* may be connected to the lens carrier 112 below the location at which the second SMA wire 144*b* is connected to the lens carrier 112. As such, the first SMA wire 144*a* and the second SMA wire 144*b* together form an "X" shape.

As schematically shown in FIG. 1D, the first SMA wire 146*a* and the second SMA wire 146*b* of the second pair of SMA wires 124*b* may each be attached at one end to the coil holder 116 and at the other end to the lens carrier 112, in a criss-cross manner. Taking the left side connections of the wires in FIG. 1D, for example, the first SMA wire 146*a* may be connected to the coil holder 116 below the location at which the second SMA wire 146*b* is connected to the coil holder 116. Taking the right side connections of the wires in FIG. 1D, the first SMA wire 146*a* may be connected to the lens carrier 112 above the location at which the second SMA wire 146*b* is connected to the lens carrier 112. As such, the first SMA wire 146*a* and the second SMA wire 146*b* together form an "X" shape.

Figure 2A:
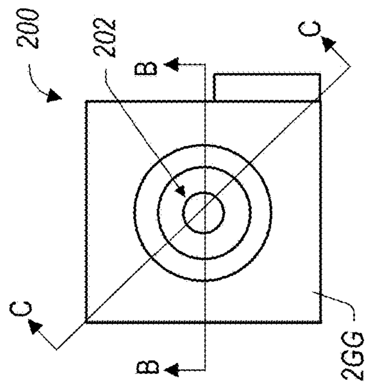
FIGS. 2A-2C illustrate views of an example camera system that may include one or more SMA actuators, in accordance with some embodiments.
Figure 2B:
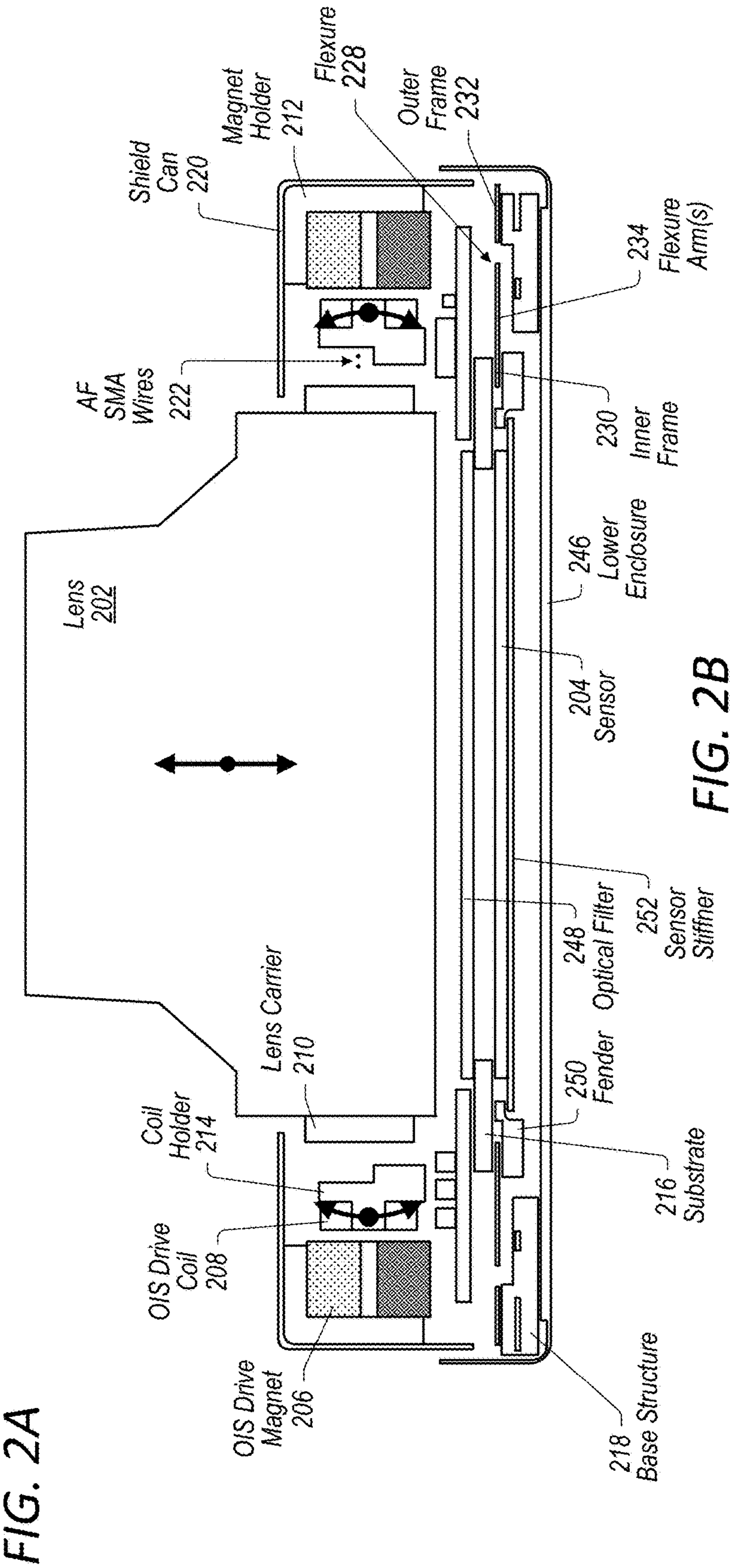
Figure 2C:
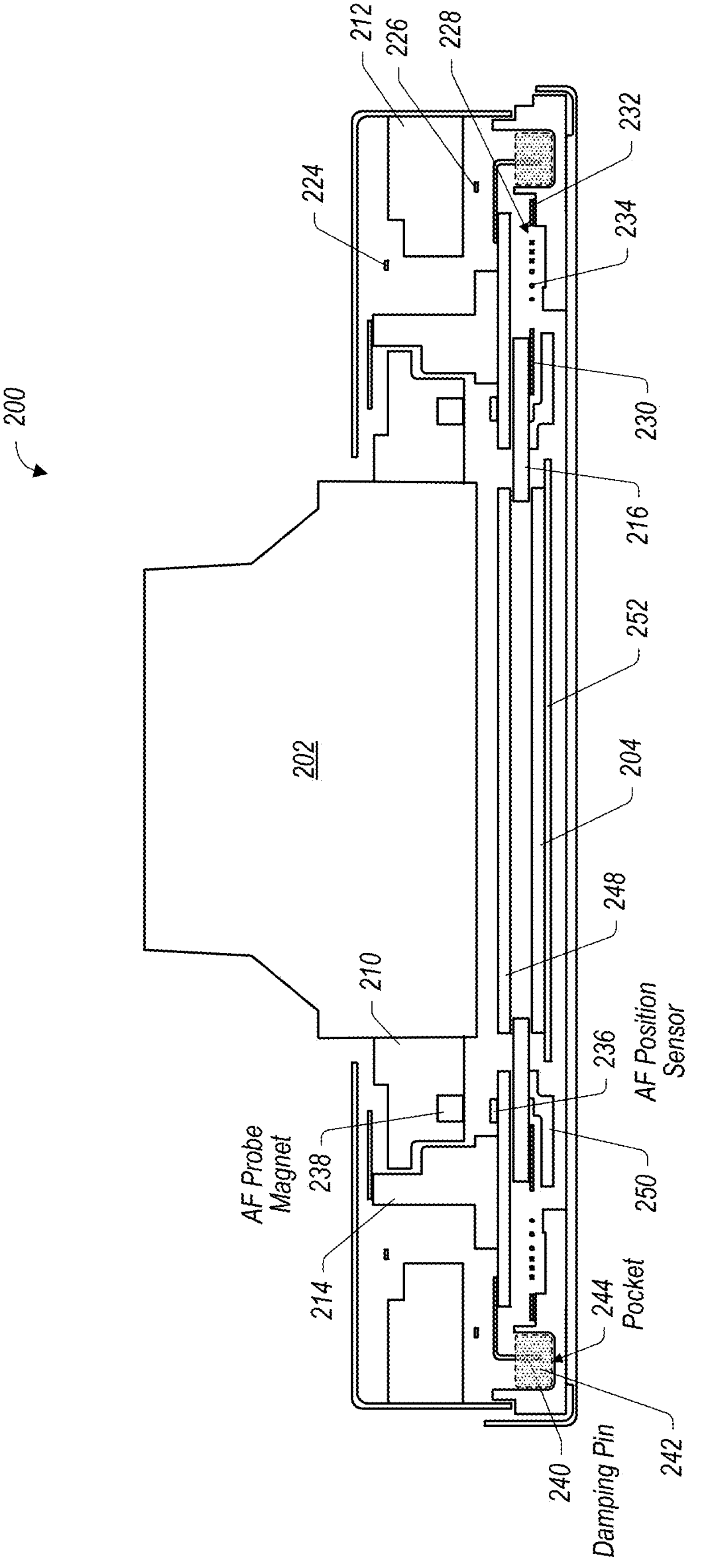

In various embodiments, the coil holder 116 may be "stationary" relative to the lens carrier 116, for AF motion purposes. That is, while the coil holder 116 may be movable relative to one or more other stationary components (e.g., relative to the base structure 120 in FIG. 1A during OIS motion), the coil holder 116 may substantially remain in a same position along the optical axis 106, relative to the lens carrier 112 which moves during AF actuation. In some embodiments, the first SMA wire 144*a* (of the first pair of SMA wires 124*a*) and the first SMA wire 146*a* (of the second pair of SMA wires 124*b*) may be activated/heated (e.g., by running an electrical current therethrough) to cause those wires to retract and thereby move the lens carrier 112 in a first direction, relative to the coil holder 116, parallel to the optical axis 106. Likewise, the second SMA wire 144*b* (of the first pair of SMA wires 124*a*) and the second SMA wire 146*b* (of the second pair of SMA wires 124*b*) may be activated/heated (e.g., by running an electrical current therethrough) to cause those wires to retract and thereby move the lens carrier 112 in a second direction (opposite the first direction), relative to the coil holder 116, parallel to the optical axis 106. In this manner, one pair of the SMA wires may be used to move the lens carrier 112 upward and another pair of the SMA wires may be used to move the lens carrier 112 downward to implement AF motion. FIGS. 2A-2C illustrate views of an example camera system 200 that may include one or more SMA actuators, in accordance with some embodiments. FIG. 2A shows a top view of the camera system 200. FIG. 2B shows a cross-sectional side view of the camera system 200, taken at section line 2B-2B indicated in FIG. 2A. FIG. 2C shows a cross-sectional side view of the camera system 200, taken at section line 2C-2C indicated in FIG. 2A.

According to various embodiments, the camera system 200 may include a lens group 202, an image sensor 204, one or more actuator arrangements, and/or one or more suspension arrangements. The actuator arrangement(s) may include an autofocus (AF) actuator and/or an optical image stabilization (OIS) actuator. In various embodiments, the AF actuator may be configured to move the lens group 202, relative to the image sensor 204, in directions parallel to an optical axis (e.g., optical axis 106 in FIG. 1A). Furthermore, the OIS actuator may be configured to tilt the lens group 202, together with the image sensor 204, about multiple axes orthogonal to the optical axis.

In some embodiments, the OIS actuator be an OIS voice coil motor (VCM) actuator. As indicated in FIG. 2B, for example, the OIS VCM actuator may include OIS drive magnets 206 and OIS drive coils 208. Furthermore, the camera system 200 may include a lens carrier 210, a magnet holder 212, a coil holder 214, a substrate 216, a base structure 218, and/or a shield can 220. The image sensor 204 may be coupled with the substrate 216. Furthermore, the substrate 216 may be coupled with the coil holder 214, e.g., such that the image sensor 204 is movable together with the substrate 216 and the coil holder 214. In various embodiments, the magnet holder 212 may be coupled with the base structure 218 and/or the shield can 220. The magnet holder 212, the base structure 218, and the shield can 220 may be stationary components of the camera system 200 in various embodiments.

As previously mentioned, the OIS VCM actuator may include OIS drive magnets 206 and OIS drive coils 208. The OIS drive magnets 206 may be coupled with the magnet holder 212. The OIS drive coils 208 may be coupled with the coil holder 214. In various embodiments, a respective OIS drive coil 208 may be positioned proximate a respective OIS drive magnet 206, e.g., such that, when driven with electric current, the respective OIS drive coil 208 is capable of electromagnetically interacting with the respective OIS drive magnet 206 to tilt the coil holder 214 (and the substrate 216 and the image sensor 204 coupled therewith), together with the lens carrier 210 (and the lens group 202 coupled therewith), about multiple axes orthogonal to the optical axis. In this manner, the OIS VCM actuator may be configured to enable OIS tilt motion of the lens group 202 together with the image sensor 204.

In various embodiments, the AF actuator may be an AF SMA actuator that includes SMA wires 222 configured to move the lens group 202, relative to the image sensor 204, in directions parallel to the optical axis. In various embodiments, the SMA wires 222 may be coupled with the lens carrier 210 and the coil holder 214. In some non-limiting embodiments, the SMA wires 222 may be arranged in multiples (e.g., in multiple pairs), e.g., as discussed herein with reference to FIG. 1A. According to various embodiments, the SMA wires 222 may generally be arranged and/or function like the SMA wires 124 described herein with reference to FIGS. 1A-1D.

In various embodiments, the suspension arrangement(s) of the camera system 200 may include a spring suspension arrangement and/or a flexure suspension arrangement. In some embodiments, the spring suspension arrangement may include an upper spring 224 (FIG. 2C) and/or a lower spring 226 (FIG. 2C).

In some embodiments, the upper spring 224 may be coupled with the lens carrier 210 and the coil holder 214. For example, a first portion of the upper spring 224 may be attached to the lens carrier 210, and a second portion of the upper spring 224 may be attached to the coil holder 214. According to various embodiments, the upper spring 224 may suspend the lens group 202 from the coil holder 214 and allow motion of the lens group 202 and/or the image sensor 204 enabled by the actuator arrangement(s).

In some embodiments, the lower spring 226 may be coupled with the coil holder 214 and the magnet holder 212. For example, a first portion of the lower spring 226 may be attached to the coil holder 214, and a second portion of the lower spring 226 may be attached to magnet holder 212. According to various embodiments, the lower spring 226 may suspend the coil holder 214 from the magnet holder 212 and allow motion of the lens group 202 enabled by the actuator arrangement(s).

According to some embodiments, the flexure suspension arrangement may include a flexure 228. In some non-limiting embodiments, the flexure 228 may include an inner frame 230, an outer frame 232, and one or more flexure arms 234 that extend from the inner frame 230 to the outer frame 232, e.g., as indicated in FIGS. 2B-2C. The inner frame 230 may be coupled with the substrate 216. The outer frame 232 may be coupled with one or more stationary structures (e.g., the base structure 218) of the camera system 200. In some embodiments, the flexure 228 and/or the flexure arm(s) 234 may be configured to provide sufficient stiffness to suspend the image sensor 204 from the stationary structure(s) and avoid undesired motion, while also providing sufficient compliance to enable intended motion caused by the VCM OIS actuator.

In some embodiments, the flexure 228 and/or the flexure arm(s) 234 may be used to route/convey electrical signals between components of the camera system 200. Such electrical signals may include, for example, image signals, power signals, and/or drive signals, etc. Electrical signals may be conveyed between the stationary component(s) (e.g., the base structure 218) and the image sensor 204 via the flexure 228 and the substrate 216 in some embodiments. For example, electrical signals may be conveyed from the stationary component(s) to the outer frame 228, then from the outer frame 232 to the inner frame 230 via electrical traces (not shown) on the flexure arm(s) 234, then from the inner frame 230 to the substrate 216, and then from the substrate 216 to the image sensor 204. The same path may be taken in reverse to convey electrical signals from the image sensor 204 to the stationary component(s) in some embodiments.

As will be discussed in further detail herein with reference to FIGS. 3A-4D, the camera system 200 may include a position sensor arrangement. For example, the position sensor arrangement may include one or more position sensors and one or more magnets that can be sensed by the position sensor(s) for position determination purposes. In various embodiments, the position sensor arrangement may include AF position sensor(s) (and corresponding magnets) and/or OIS position sensor(s) (and corresponding magnets). As a non-limiting example, the camera system 200 may include AF position sensor(s) 236 and AF probe magnet(s) 238, as indicated in FIG. 2C. The AF position sensor(s) 236 may be coupled with the substrate 216. For example, a first AF position sensor 236 may be attached (e.g., surface mounted) to an upper surface of the substrate 216. The AF probe magnet(s) 238 may be coupled with the lens carrier 210. For example, the AF probe magnet(s) 238 may be attached to a lower portion of the lens carrier 210.

In some embodiments, the camera system 200 may include a motion damping arrangement. The damping arrangement may include, for example, one or more damping pins 240 and a damping gel 242 (and/or one or more other viscoelastic materials). The damping gel 242 may be contained within one or more pockets 244. For example, a pocket 244 may be defined by the base structure 218. A damping pin 240 may be coupled with a movable component (e.g., the substrate 216) and may extend such that at least a portion of the damping pin 240 is disposed within the damping gel 242. During motion of the substrate 216, the damping pin 240 traverses the damping gel 242, thereby providing a resistive force to the motion.

According to some embodiments, the camera system 200 may include a lower enclosure 246, an optical filter 248 (e.g., an infrared cut-off filter (IRCF)), and/or a fender 250. The shield can 220 and the lower enclosure 246 may encase at least a portion of the camera system 200. In some non-limiting embodiments, the shield can 220 may encase a first portion (e.g., an upper portion) and the lower enclosure 246 may encase a second portion (e.g., a lower portion). As indicated in FIGS. 2B-2C, a portion of the lower enclosure 246 may overlap with a portion of the shield can 220 in some embodiments.

The optical filter 248 may be coupled with the substrate 216. Furthermore, the optical filter 248 may be positioned above the image sensor 204, e.g., such that light passes through the optical filter 248 before it reaches the image sensor 204. As will be discussed herein with reference to FIG. 9C, the fender 250 may form at least a portion of an end stop of the camera system 200. For example, the fender 250 and the lower enclosure 246 may form at least a portion of an OIS bottom end stop. The fender 250 may tilt/rotate during OIS actuation/motion, until the fender 250 reaches the lower enclosure 246, which stops the fender 250 from tilting any further in that direction. Furthermore, the camera system 200 may include a stiffener 252 in various embodiments. For example, the stiffener 252 may be positioned below the image sensor 204 and may provide structural support to the image sensor 204.

Figure 3A:
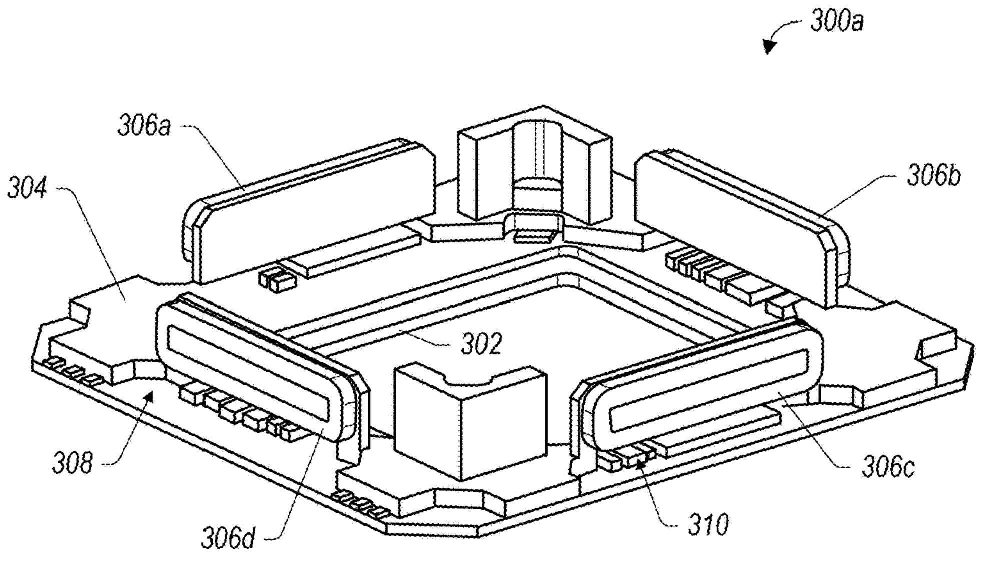
FIGS. 3A-3B illustrate views of example camera components that may be included in a camera system having one or more SMA actuators, in accordance with some embodiments.
Figure 3B:
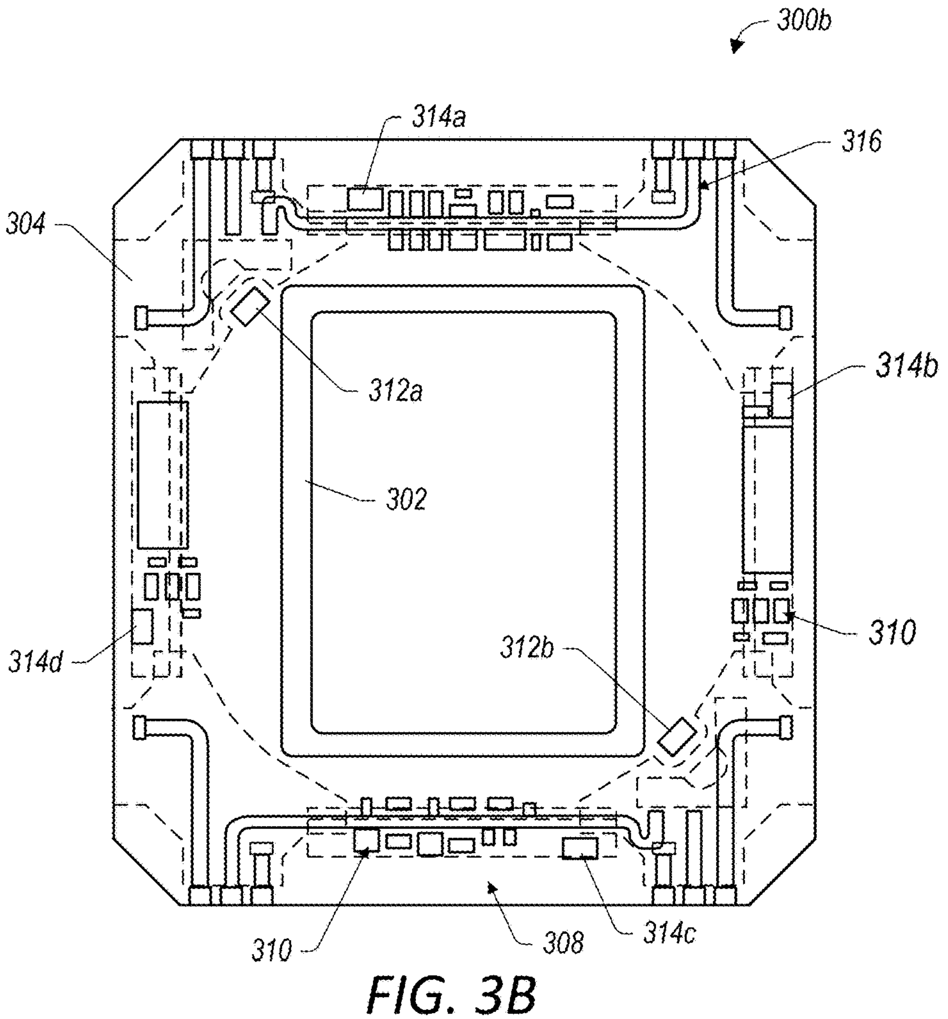

FIGS. 3A-3B illustrate views of example camera components 300 that may be included in a camera system having one or more SMA actuators, in accordance with some embodiments. FIG. 3A shows a perspective view of example camera components **300*a* including a substrate 302 coupled with a coil holder 304. FIG. 3B shows a top view of example camera components 300*b*** including the substrate.

According to various embodiments, the coil holder 304 may be coupled with the substrate 302. For example, the coil holder 304 may be attached to an upper surface of the substrate 302, as indicated in FIG. 3A. The coil holder 304 may be configured to hold one or more coils, e.g., optical image stabilization (OIS) drive coils of a voice coil motor (VCM) actuator.

As a non-limiting example, the camera components 300 may include multiple OIS drive coils 306. In some embodiments, the OIS drive coils 306 may include a first OIS drive coil **306*a*, a second OIS drive coil 306*b*, a third OIS drive coil 306*c*, and a fourth OIS drive coil 306*d*. The first OIS drive coil 306*a* may be attached to a first side of the coil holder 304. The second OIS drive coil 306*b* may be attached to a second side of the coil holder 304. The third OIS drive coil 306*c* may be attached to a third side of the coil holder 304 that is opposite the first side of the coil holder 304. The fourth OIS drive coil 306*d* may be attached to a fourth side of the coil holder 304 that is opposite the third side of the coil holder 304**.

According to some embodiments, the coil holder 304 may be attached to the substrate 302 at the corners. As indicated in FIG. 3A, the corners of the coil holder 304 may extend further towards the corners of the substrate 302 than do the sides of the coil holder 304 to the sides of the substrate 302. For example, at least a portion of one or more of the sides of the coil holder 304 may define cutout areas 308. The cutout areas 308 may provide space for placement of one or more electronic components 310 (e.g., surface mount technology (SMT) component(s) 310), e.g., as indicated in FIG. 3A.

In various embodiments, the camera components **300*b* in FIG. 3B may include one or more position sensors. For example, the camera components 300*b* may include AF position sensors 312 and OIS/tilt position sensors 314. The AF position sensors 312 may include a first AF position sensor 312*a* and a second AF position sensor 312*b*, e.g., positioned in the manner indicated in FIG. 3B. The OIS/tilt position sensors 314 may include a first OIS/tilt position sensor 314*a*, a second OIS/tilt position sensor 314*b*, a third OIS/tilt position sensor 314*c*, and a fourth OIS/tilt position sensor 314*d*, e.g., positioned in the manner indicated in FIG. 3B. Embodiments of an example position sensor arrangement are discussed in further detail herein with reference to FIGS. 4A-4D**.

In various embodiments, the camera components **300*b* may include electrical paths 316. For example, the electrical paths 316 may be used for driving SMA wires (e.g., AF SMA wires 124 in FIG. 1A) and/or for driving the OIS drive coils 306. In various embodiments, the electrical paths 316 may comprise conductive material on (and/or embedded in) the substrate. Embodiments of example electrical paths are also discussed herein with reference to FIGS. 7B and 8B**.

Figure 4A:
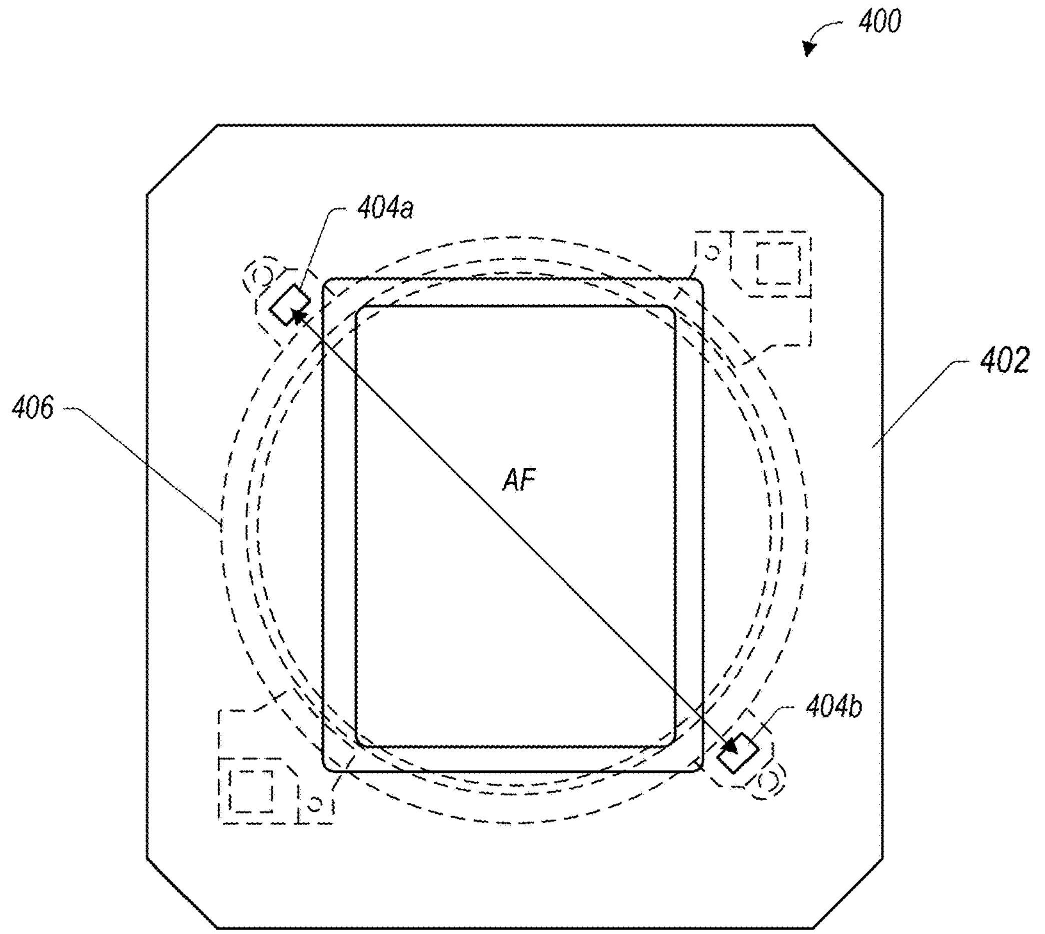
FIGS. 4A-4D illustrate views of an example position sensor arrangement that may be included in a camera system having one or more SMA actuators.
Figure 4B:
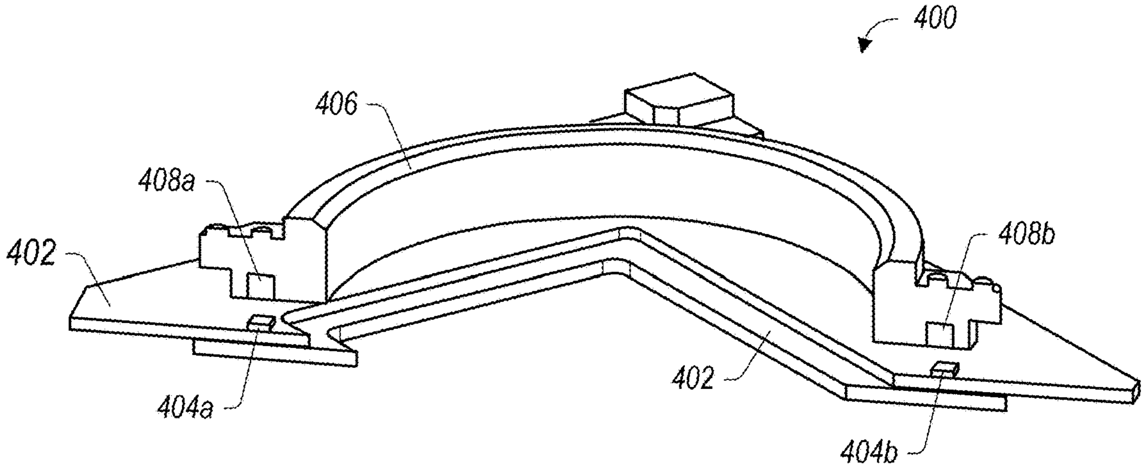
Figure 4C:
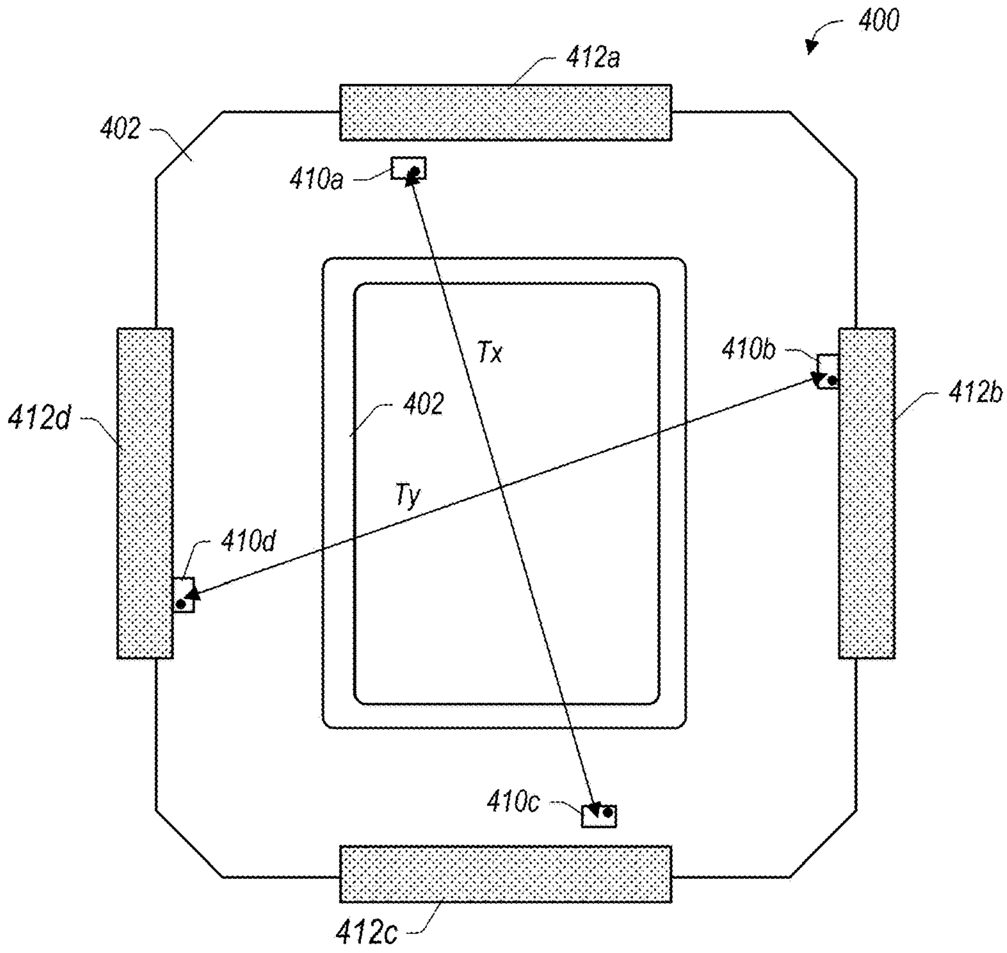
Figure 4D:
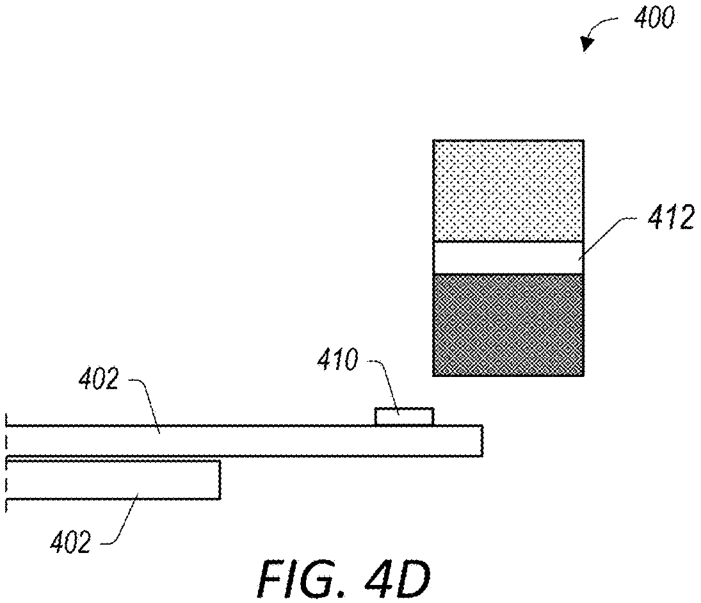

FIGS. 4A-4D illustrate views of an example position sensor arrangement 400 that may be included in a camera system having one or more SMA actuators (e.g., comprising SMA wires, such as AF SMA wires 124 in FIG. 1A). FIG. 4A shows a top view of a substrate 402 and autofocus (AF) position sensors 404 coupled therewith. FIG. 4B shows a cross-sectional perspective view of a portion of the substrate 402 and a portion of a lens carrier 406 (with AF sensing magnets 408 coupled therewith). FIG. 4C shows a top view of the substrate 402 and optical image stabilization (OIS) position sensors 410 coupled therewith. FIG. 4D shows a partial cross-sectional side view of the substrate 402 (with an OIS position sensor 410 coupled therewith) and a drive magnet 412.

According to various embodiments, the AF position sensors 404 may include a first AF position sensor **404*a* and a second AF position sensor 404*b*, e.g., as indicated in FIGS. 4A-4B. Furthermore, the AF sensing magnets 408 may include a first AF sensing magnet 408*a* and a second AF sensing magnet 408*b*, e.g., as indicated in FIG. 4B. The first AF position sensor 404*a* may be positioned proximate the first AF sensing magnet 408*a*. For example, the first AF position sensor 404*a* may be positioned below the first AF sensing magnet 408*a*, so that the first AF position sensor 404*a* may sense changes in the magnetic field of the first AF sensing magnet 408*a* as the lens carrier 406 (and the first AF sensing magnet 408*a*) moves in directions parallel to an optical axis of the camera system. In some embodiments, the first AF position sensor 404*a* and the first AF sensing magnet 408*a* may be vertically aligned, e.g., such that a first axis parallel to the optical axis intersects the first AF position sensor 404*a* and the first AF sensing magnet 408*a***.

The second AF position sensor **404*b* may be positioned proximate the second AF sensing magnet 408*b*. For example, the second AF position sensor 404*b* may be positioned below the second AF sensing magnet 408*b*, so that the second AF position sensor 404***b* may sense changes in the magnetic field of the second AF sensing magnet 408*b* as the lens carrier 406 (and the second AF sensing magnet 408*b*) moves in directions parallel to the optical axis. In some embodiments, the second AF position sensor 404*b* and the second AF sensing magnet 408*b* may be vertically aligned, e.g., such that a second axis parallel to the optical axis intersects the second AF position sensor 404*a* and the second AF sensing magnet 408*b*.

According to various embodiments, the OIS position sensors 410 may include a first OIS position sensor 410*a*, a second OIS position sensor 410*b*, a third OIS position sensor 410*c*, and a fourth OIS position sensor 410*d*, e.g., as indicated in FIG. 4C. Furthermore, the drive magnets 412 may include a first drive magnet 412*a*, a second drive magnet 412*b*, a third drive magnet 412*c*, and a fourth drive magnet 412*d*, e.g., as indicated in FIG. 4C. In some embodiments, the drive magnets 412 may be OIS drive magnets (e.g., OIS drive magnets 108 in FIG. 1A). The first OIS position sensor 410*a* may be positioned proximate the first drive magnet 412*a*. The second OIS position sensor 410*b* may be positioned proximate the second drive magnet 412*b*. The third OIS position sensor 410*c* may be positioned proximate the third drive magnet 412*c*. The fourth OIS position sensor 410*d* may be positioned proximate the fourth drive magnet 412*d*.

As indicated in FIG. 4D, each respective OIS position sensor 410 may have a corresponding drive magnet 412 located nearby, so that the respective OIS position sensor 410 is capable of sensing changes in the magnetic field of the corresponding drive magnet 412 as the substrate 402 (and the respective OIS position sensor 410 coupled therewith) tilt relative to the corresponding drive magnet 412.

In some embodiments, the first OIS position sensor 410*a* and the third OIS position sensor 410*c* may be used to detect an amount of tilt/rotation about a first axis (e.g., the X-axis) orthogonal to the optical axis. The second OIS position sensor 410*b* and the fourth OIS position sensor 410*d* may be used to detect an amount of tilt/rotation about a second axis (e.g., the Y-axis) orthogonal to the optical axis and orthogonal to the first axis.

Figure 5A:
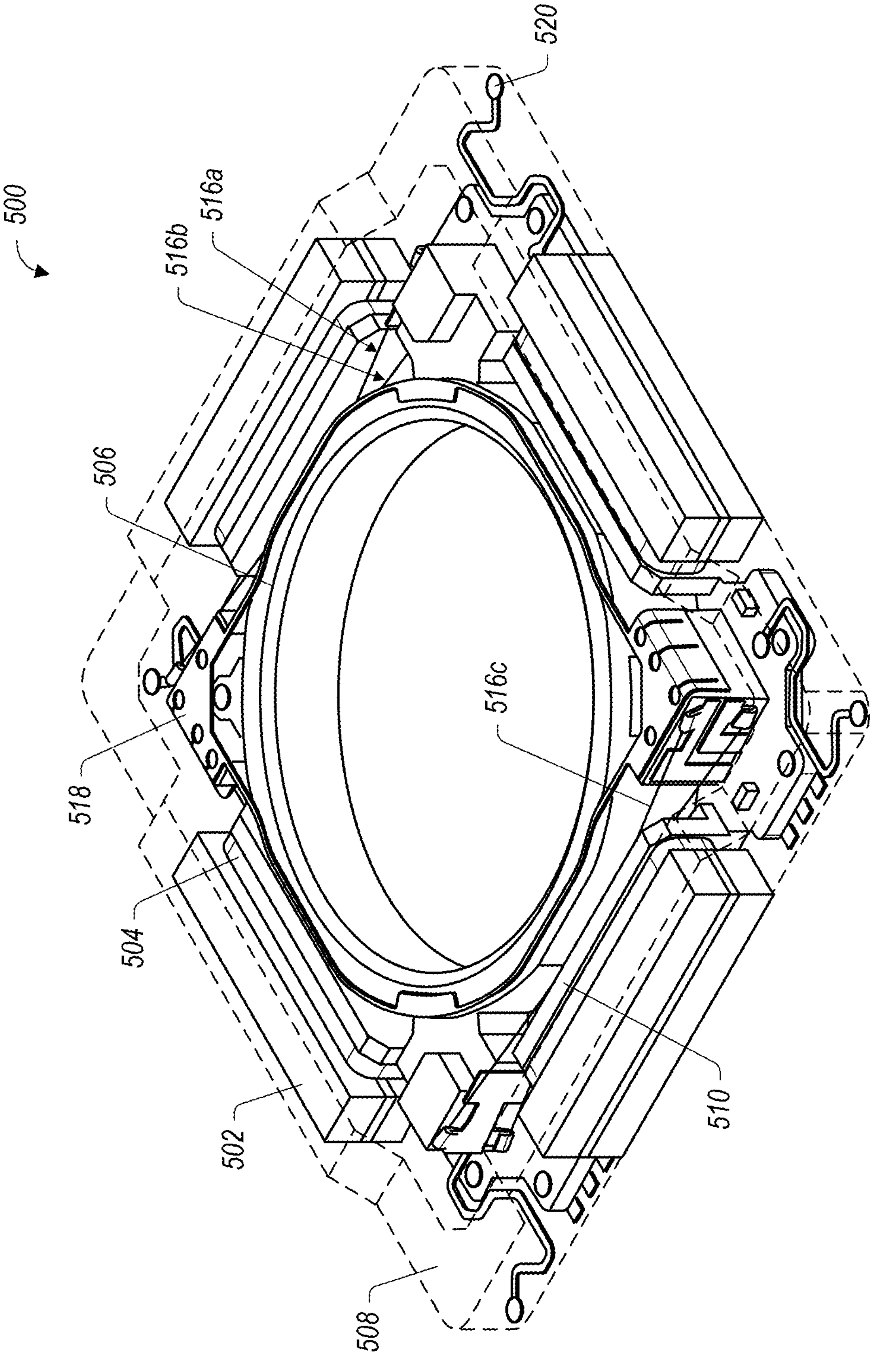
FIGS. 5A-5C illustrate views of an example camera system that may include one or more SMA actuators, in accordance with some embodiments.
Figure 5B:
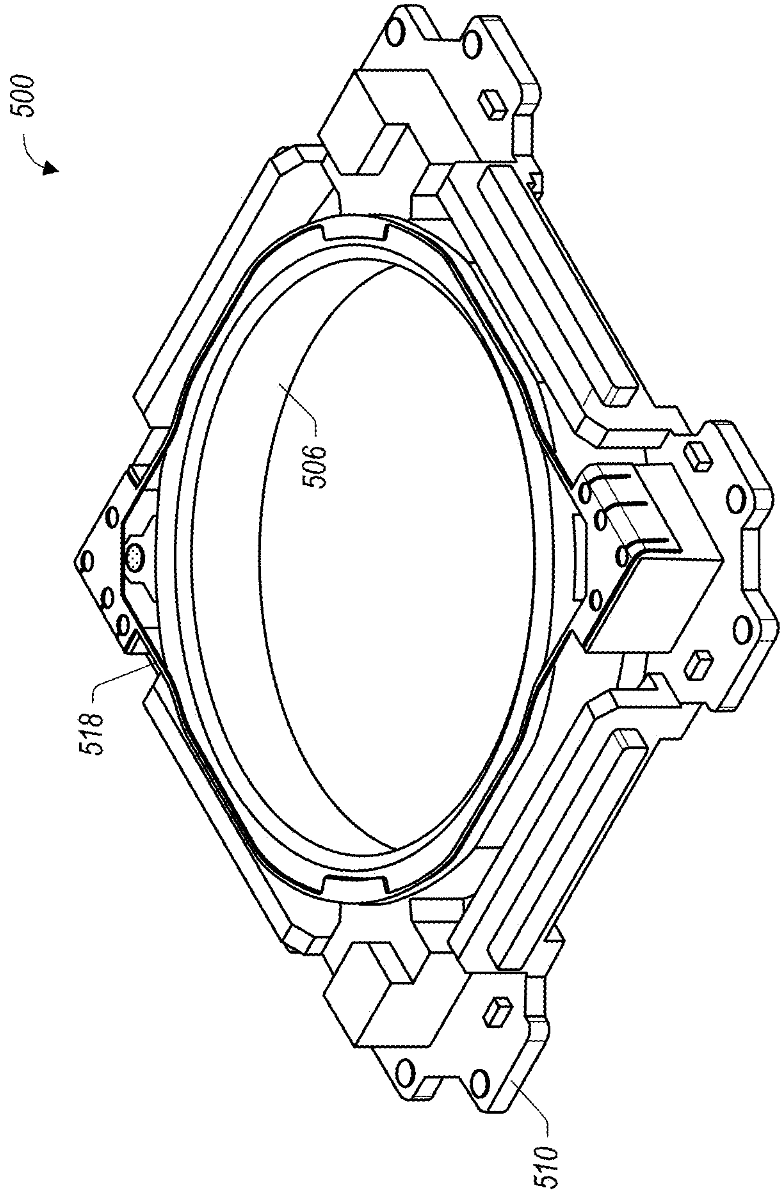
Figure 5C:
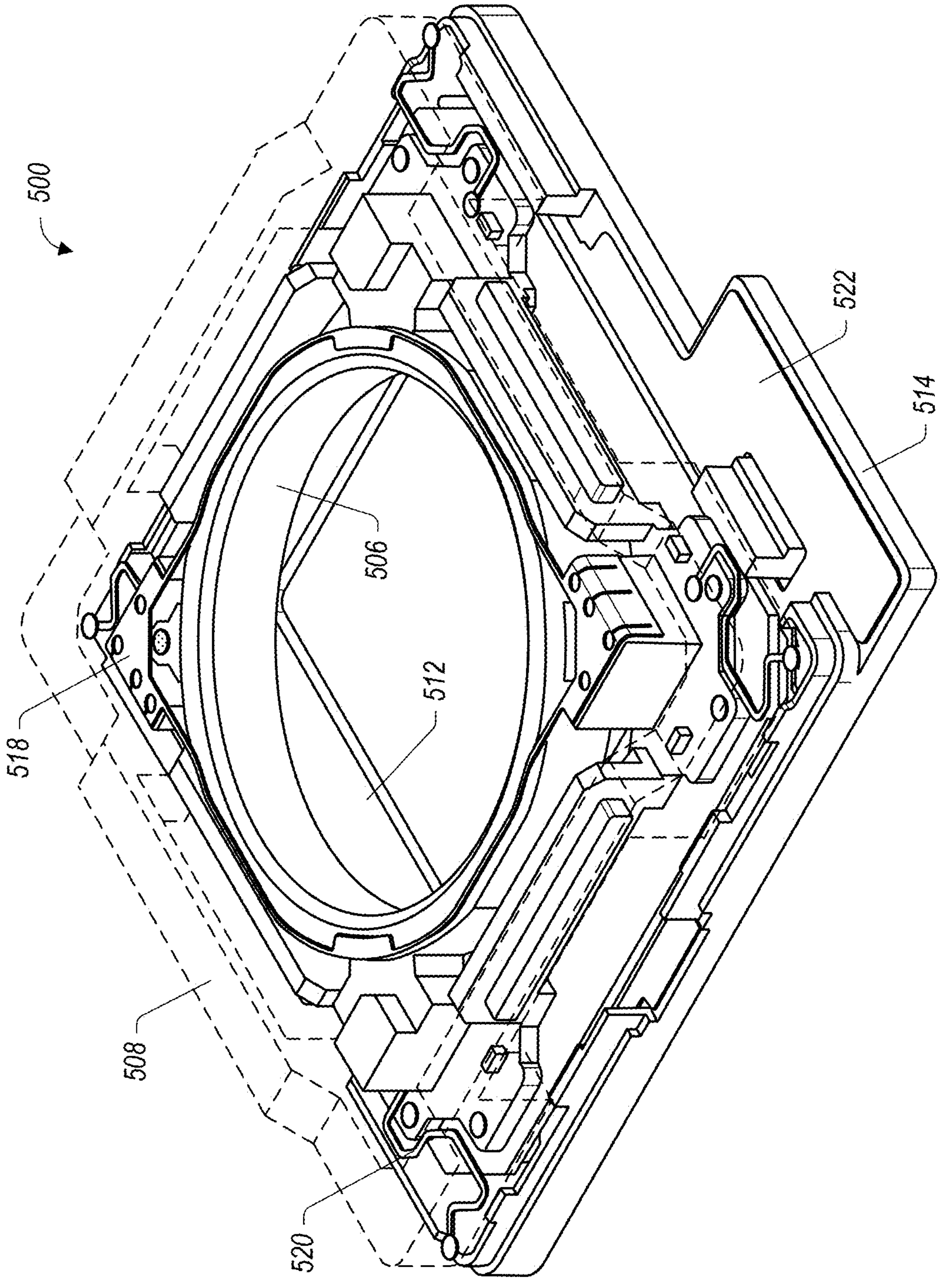

FIGS. 5A-5C illustrate views of an example camera system 500 that may include one or more SMA actuators, in accordance with some embodiments. FIG. 5A shows a perspective view of an example actuator arrangement that may be included in the camera system 500. In various embodiments, the actuator arrangement may include SMA actuator(s) and/or one or more voice coil motor (VCM) actuators. FIG. 5B shows a portion of an example suspension arrangement that may be included in the camera system 500, and that may be used, e.g., to suspend the lens and enable AF motion. FIG. 5C shows a portion of the suspension arrangement that may be used, e.g., to suspend the lens and the image sensor and enable OIS motion.

In various embodiments, the actuator arrangement of the camera system 500 may include an AF SMA actuator and an OIS VCM actuator. The AF SMA actuator may be configured to move a lens group (e.g., lens group 102 in FIG. 1A) of the camera system 500, relative to an image sensor (e.g., image sensor 104 in FIG. 1A) of the camera system 500, in directions parallel to an optical axis (e.g., optical axis 106 in FIG. 1A) of the camera system 500. Furthermore, the OIS VCM actuator may be configured to tilt the lens group, together with the image sensor, about multiple axes orthogonal to the optical axis.

As indicated in FIG. 5A, the OIS VCM actuator may include OIS drive magnets 502 and OIS drive coils 504. Furthermore, the camera system 500 may include a lens carrier 506, a magnet holder 508, a coil holder 510, a substrate 512 (FIG. 5C), a base structure 514 (FIG. 5C), and/or a shield can (e.g., shield can 122 in FIG. 1A). The image sensor may be coupled with the substrate 512. Furthermore, the substrate 512 may be coupled with the coil holder 510, e.g., such that the image sensor is movable together with the substrate 512 and the coil holder 510. In various embodiments, the magnet holder 508 may be coupled with the base structure 514 and/or the shield can. The magnet holder 508, the base structure 514, and the shield can may be stationary components of the camera system 500 in various embodiments.

As previously mentioned, the OIS VCM actuator may include OIS drive magnets 502 and OIS drive coils 504. The OIS drive magnets 502 may be coupled with the magnet holder 508. The OIS drive coils 504 may be coupled with the coil holder 510. In various embodiments, a respective OIS drive coil 504 may be positioned proximate a respective OIS drive magnet 502, e.g., such that, when driven with electric current, the respective OIS drive coil 504 is capable of electromagnetically interacting with the respective OIS drive magnet 502 to tilt the coil holder 510 (and the substrate and image sensor coupled therewith), together with the lens carrier 506 (and the lens group coupled therewith), about multiple axes orthogonal to the optical axis. In this manner, the OIS VCM actuator may be configured to enable OIS tilt motion of the lens group together with the image sensor.

As indicated in FIG. 5A, the AF actuator may be an AF SMA actuator that includes SMA wires 516 configured to move the lens group, relative to the image sensor, in directions parallel to the optical axis. In various embodiments, the SMA wires 516 may be coupled with the lens carrier 506 and the coil holder 510, e.g., as indicated in FIG. 5A. In some non-limiting embodiments, the SMA wires 516 may be arranged in multiples (e.g., multiple pairs), e.g., disposed at different locations circumferentially around the lens group.

For example, according to some non-limiting embodiments, the SMA wires 516 may include a first pair of SMA wires (e.g., first SMA wire 516*a* and second SMA wire 516*b*), and a second pair of SMA wires (e.g., third SMA wire 516*c* and fourth SMA wire 516*d*). The first pair of SMA wires may be disposed proximate a first side of the camera system 500. The second pair of SMA wires may be disposed proximate a second side of the camera system 500 opposite the first side. According to various embodiments, the SMA wires 516 may generally be arranged and/or function like the SMA wires 124 described herein with reference to FIGS. 1A-1D.

In various embodiments, the suspension arrangement(s) of the camera system 500 may include a spring suspension arrangement and/or a flexure suspension arrangement. In some embodiments, the spring suspension arrangement may include one or more upper springs 518 and/or one or more lower spring 520.

In some embodiments, the upper spring(s) 518 may be coupled with the lens carrier 506 and the coil holder 510. For example, a first portion of the upper spring(s) 518 may be attached to the lens carrier 506, and a second portion of the upper spring(s) 518 may be attached to the coil holder 510, as indicated in FIGS. 5A-5C. According to various embodiments, the upper spring(s) 518 may suspend the lens group from the coil holder 510 and allow motion of the lens group and/or the image sensor enabled by the actuator arrangement(s).

In some embodiments, the lower spring(s) 520 may be coupled with the coil holder 510 and the magnet holder 508. For example, a first portion of a respective lower spring 520 may be attached to the coil holder 510 and a second portion of the respective lower spring 520 may be attached to the magnet holder 508, as indicated in FIGS. 5A and 5C. According to various embodiments, the lower spring(s) 520 may suspend the coil holder 510 from the magnet holder 508 and allow motion of the lens group and the image sensor enabled by the actuator arrangement(s).

According to some embodiments, the flexure suspension arrangement may include a flexure 522, which may be similar to, or the same as, flexure 130 described herein with reference to FIG. 1A. In some non-limiting embodiments, the flexure 522 may include an inner frame, an outer frame, and one or more flexure arms that extend from the inner frame to the outer frame. The inner frame may be coupled with the substrate 512. The outer frame may be coupled with one or more stationary structures (e.g., the base structure 514) of the camera system 500. In some embodiments, the flexure 522 and/or the flexure arm(s) may be configured to provide sufficient stiffness to suspend the image sensor from the stationary structure(s) and avoid undesired motion, while also providing sufficient compliance to enable intended motion caused by the VCM OIS actuator.

In some embodiments, the flexure 522 and/or the flexure arm(s) may be used to route/convey electrical signals between components of the camera system 500. Such electrical signals may include, for example, image signals, power signals, and/or drive signals, etc. Electrical signals may be conveyed between the stationary component(s) (e.g., the base structure 514) and the image sensor via the flexure 522 and the substrate 512 in some embodiments. For example, electrical signals may be conveyed from the stationary component(s) to the outer frame, then from the outer frame to the inner frame via electrical traces (not shown) on the flexure arm(s), then from the inner frame to the substrate 512, and then from the substrate 512 to the image sensor. The same path may be taken in reverse to convey electrical signals from the image sensor to the stationary component(s) in some embodiments.

Figure 6A:
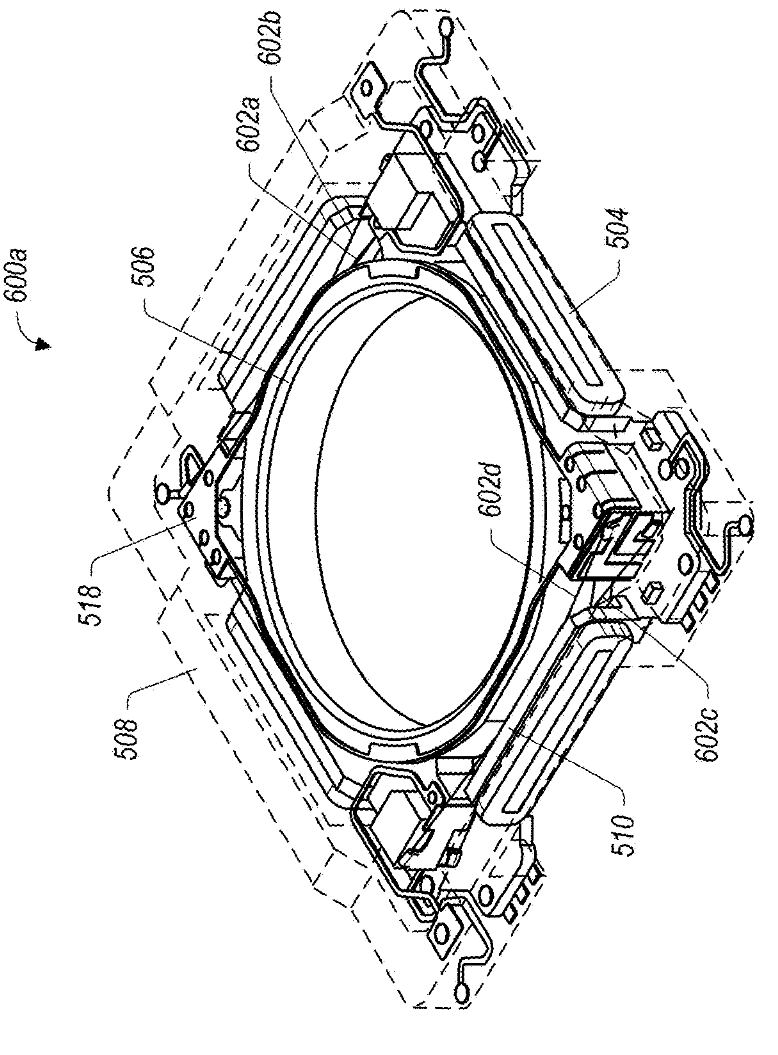
FIGS. 6A-6B illustrate views of example camera components of a camera system that may include an AF SMA actuator, in accordance with some embodiments.
Figure 6B:
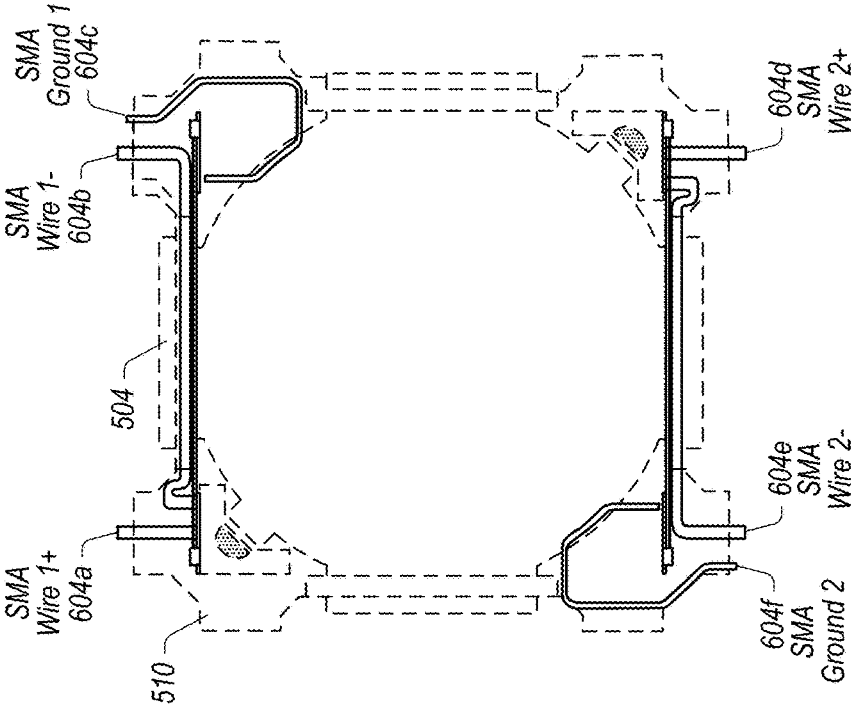

FIGS. 6A-6B illustrate views of example camera components 600 of a camera system (e.g., camera system 100 in FIG. 1A) that may include an AF SMA actuator, in accordance with some embodiments. FIG. 6A shows a perspective view of the camera components 600 including SMA wires 602 of the AF SMA actuator. FIG. 6B shows a top view of a portion of the camera components 600 including example AF SMA actuation electrical paths 604.

According to various embodiments, the SMA wires 602 may include a first pair of SMA wires (e.g., comprising SMA wires 602*a* and 602*b*) and a second pair of SMA wires (e.g., comprising SMA wires 602*c* and 602*d*). The first pair and the second pair may be located at opposite sides of the camera system, e.g., as indicated in FIG. 6A. According to various embodiments, the SMA wires 602 may generally be arranged and/or function like the SMA wires 124 described herein with reference to FIGS. 1A-1D.

As indicated in FIG. 6B, the AF SMA actuation electrical paths 604 may include multiple positive, negative, and ground terminals and respective paths. In some non-limiting embodiments, the AF SMA actuation electrical paths 604 connected to the first pair of SMA wires (e.g., comprising 602*a* and 602*b*) may include an SMA wire positive terminal/path 604*a*, an SMA wire negative terminal/path 604*b*, and SMA ground terminal/path 604*c*. In some embodiments, one or more lower coils of the suspension arrangement may be used for the ground path 604*c*.

In some non-limiting embodiments, the AF SMA actuation electrical paths 604 connected to the second pair of SMA wires (e.g., comprising 602*c* and 602*d*) may include an SMA wire positive terminal/path 604*d*, an SMA wire negative terminal/path 604*e*, and SMA ground terminal/path 604*f*. In some embodiments, one or more lower coils of the suspension arrangement may be used for the ground path 604*f*.

Figure 7B:
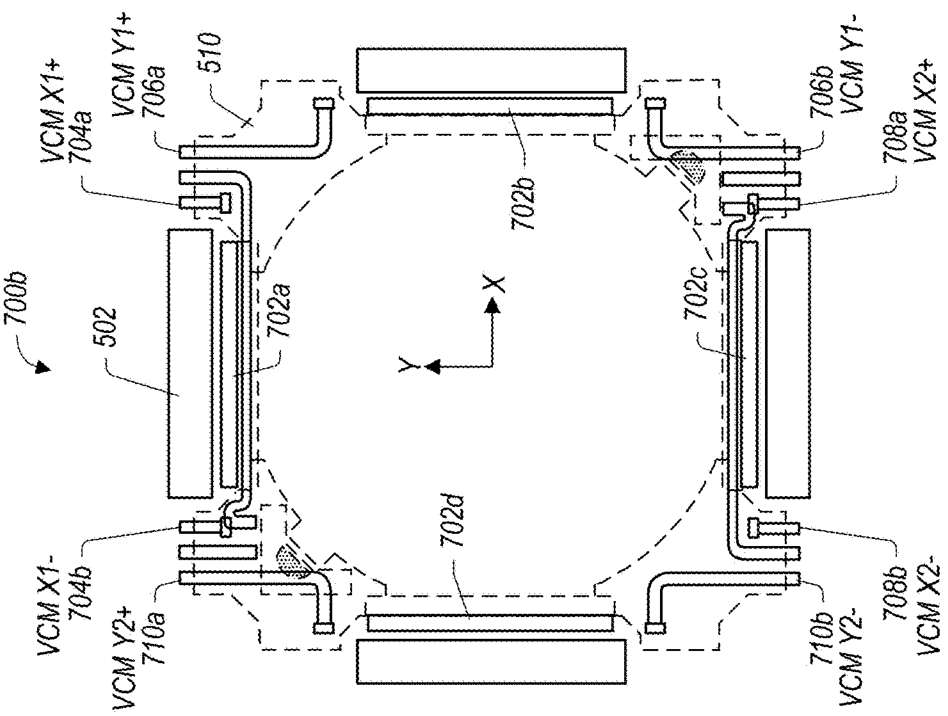
FIGS. 7A-7B illustrate views of example camera components of a camera system that may include an AF SMA actuator and an OIS VCM actuator, in accordance with some embodiments.
Figure 7A:
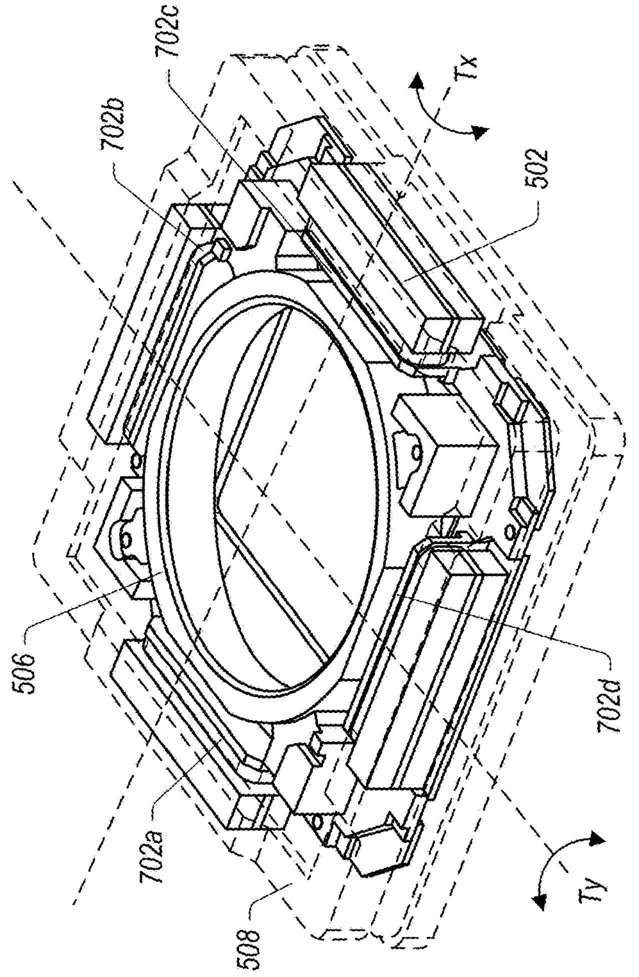

FIGS. 7A-7B illustrate views of example camera components 700 of a camera system (e.g., camera system 100 in FIG. 1A) that may include an AF SMA actuator and an OIS VCM actuator, in accordance with some embodiments. FIG. 7A shows a perspective view of the camera components 700 including electromagnetic components of the OIS VCM actuator. FIG. 7B shows a top view of a portion of the camera components 700 including example OIS VCM actuation electrical paths.

According to some embodiments, the electromagnetic components of the OIS VCM actuator may include a first OIS drive coil 702*a*, a second OIS drive coil 702*b*, a third OIS drive coil 702*c*, and a fourth OIS drive coil 702*d*. The first OIS drive coil 702*a* and the third OIS drive coil 702*c* may be located at opposite sides of the camera system, e.g., as indicated in FIGS. 7A-7B. The second OIS drive coil 702*b* and the fourth OIS drive coil 704*d* may be located at opposite sides of the camera system, e.g., as indicated in FIGS. 7A-7B.

As indicated in FIG. 7B, the OIS VCM actuation electrical paths (and respective terminals) connected to the first OIS drive coil 702*a* may include a positive terminal/path 704*a* and a negative terminal/path 704*b*. The OIS VCM actuation electrical paths connected to the second OIS drive coil 702*b* may include a positive terminal/path 706*a* and a negative terminal path 706*b*. The OIS VCM actuation electrical paths connected to the third OIS drive coil 702*c* may include a positive terminal/path 708*a* and a negative terminal path 708*b*. The OIS VCM actuation electrical paths connected to the fourth OIS drive coil 702*d* may include a positive terminal/path 710*a* and a negative terminal path 710*b*.

While the non-limiting example shown in FIG. 7B includes respective actuation electrical paths for each OIS drive coil 702, it should be understood that pairs of OIS drive coils may be driven using shared/common channels in some embodiments. For example, the first OIS drive coil 702*a* and the third OIS drive coil 702*c* may share the same positive terminal/path and the same negative terminal/path. Furthermore, the second OIS drive coil 702*b* and the fourth OIS drive coil 702*d* may share the same positive terminal-path and the same negative terminal-path. In such embodiments, four channels may be used instead of the eight channels that may be used when each OIS drive coil 702 is driven independently.

Figure 8A:
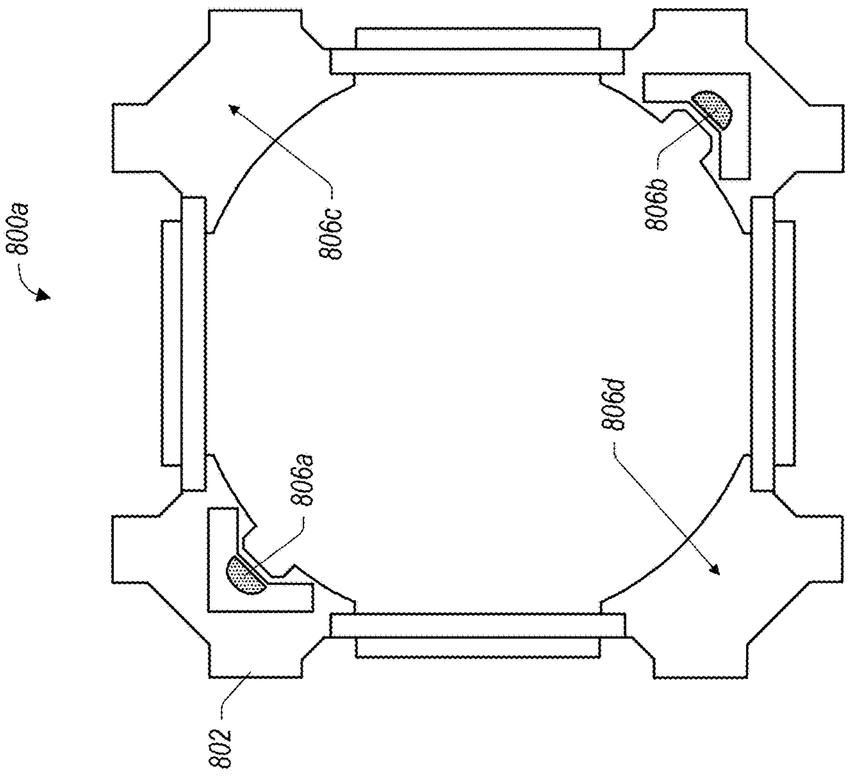
FIGS. 8A-8D illustrate views of example AF end stops that may be used in a camera system having one or more SMA actuators, in accordance with some embodiments.
Figure 8B:
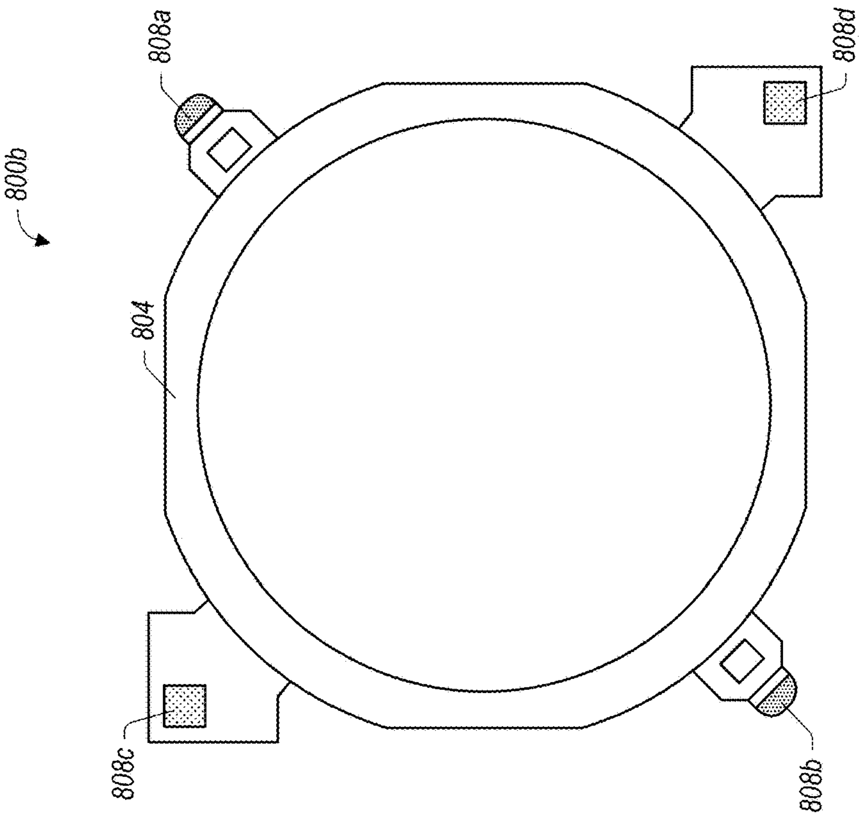
Figure 8D:
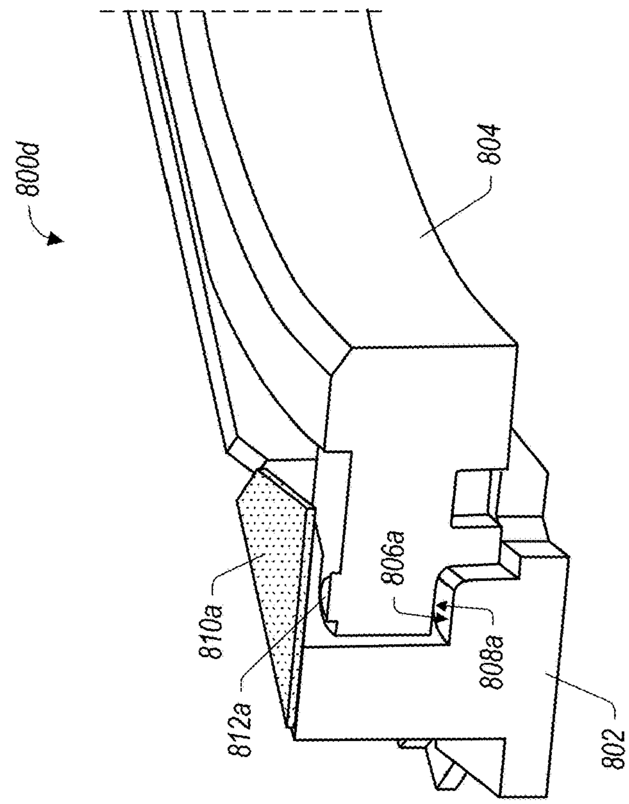
Figure 8C:
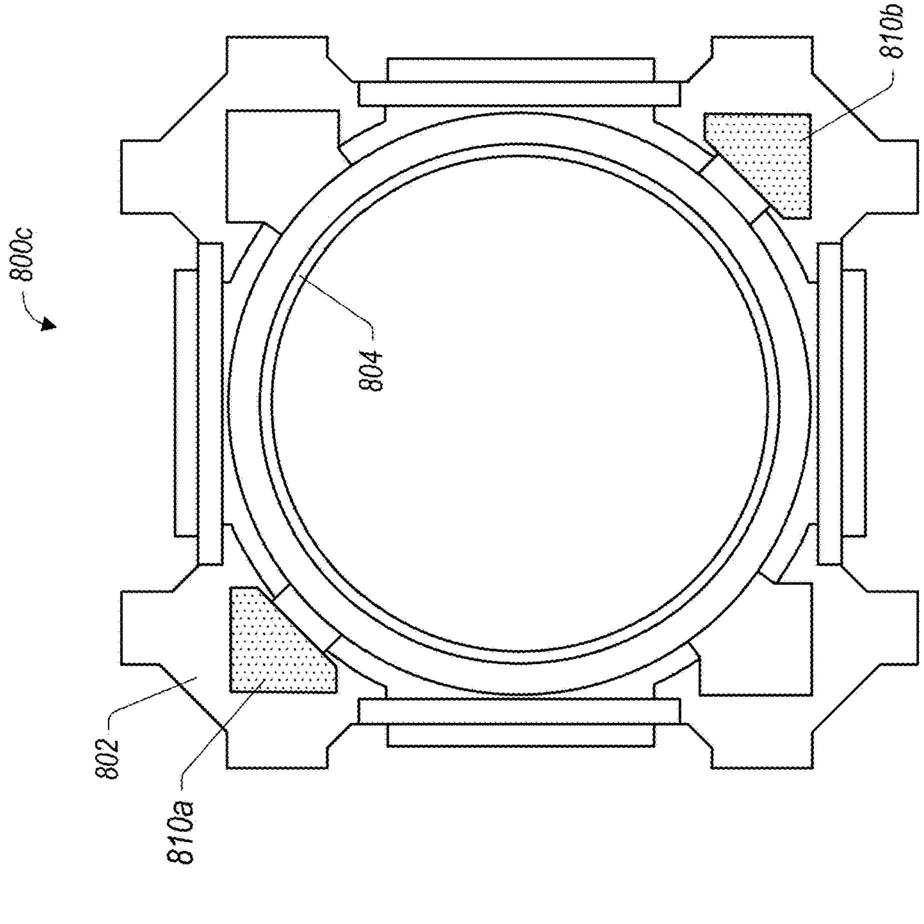

FIGS. 8A-8D illustrate views 800 of example AF end stops that may be used in a camera system having one or more SMA actuators, in accordance with some embodiments. FIG. 8A shows a cross-sectional top view 800*a* of a portion of an AF bottom end stop. FIG. 8B shows a cross-sectional bottom view 800*b* of another portion of the AF bottom end stop. FIG. 8C shows a cross-sectional top view 800*c* of an AF top end stop. FIG. 8D shows a cross-sectional perspective view of the AF top end stop.

As indicated in FIGS. 8A-8B, the AF bottom end stop may be defined, at least in part, by a coil holder 802 and a lens carrier 804 of a camera system (e.g., camera system 100 in FIG. 1A). For example, the coil holder 802 may include AF bottom end stop portions 806. In some embodiments, the AF bottom end stop portions 806 may include a first AF bottom end stop portion 806*a* and a second AF bottom end stop portion 806*b*. The lens carrier 804 may include corresponding AF bottom end stop portions 808. In some embodiments, the corresponding AF bottom end stop portions 808 may include a first corresponding AF bottom end stop portion 808*a* and a second corresponding AF bottom end stop portion 808*b*.

According to various embodiments, when the lens carrier 804 moves downwards (e.g., via AF actuation) along an axis parallel to an optical axis (e.g., optical axis 106 in FIG. 1A) of the camera system, the first AF bottom end stop portion 806*a* of the coil holder 802 may provide a lower limit to the lens carrier's 804 travel in the downward direction, as the first corresponding AF bottom end stop portion 808*a* of the lens carrier 804 would be stopped from any further downward motion once it reaches/contacts the first AF bottom end stop portion 806*a* of the coil holder 802. Likewise, the second AF bottom end stop portion 806*b* of the coil holder 802 may provide a lower limit to the lens carrier's 804 travel in the downward direction, as the second corresponding AF bottom end stop portion 808*b* of the lens carrier 804 would be stopped from any further downward motion once it reaches/contacts the second AF bottom end stop portion 806*b* of the coil holder 802.

Additionally, or alternatively, the AF bottom end stop portions 806 of the coil holder 802 may include a third AF bottom end stop portion 806*c* and a fourth AF bottom end stop portion 806*d*. In some embodiments, the corresponding AF bottom end stop portions 808 may include a third corresponding AF bottom end stop portion 808*c* and a fourth corresponding AF bottom end stop portion 808*d*.

According to various embodiments, when the lens carrier 804 moves downwards (e.g., via AF actuation) along an axis parallel to the optical axis, the third AF bottom end stop portion 806*c* of the coil holder 802 may provide a lower limit to the lens carrier's 804 travel in the downward direction, as the third corresponding AF bottom end stop portion 808*c* of the lens carrier 804 would be stopped from any further downward motion once it reaches/contacts the third AF bottom end stop portion 806*c* of the coil holder 802. Likewise, the fourth AF bottom end stop portion 806*d* of the coil holder 802 may provide a lower limit to the lens carrier's 804 travel in the downward direction, as the fourth corresponding AF bottom end stop portion 808*d* of the lens carrier 804 would be stopped from any further downward motion once it reaches/contacts the fourth AF bottom end stop portion 806*d* of the coil holder 802.

As indicated in FIGS. 8C-8D, the AF top end stop may be defined, at least in part, by the coil holder 802 and the lens carrier 804. For example, the coil holder 802 may include AF top end stop portions 810. In various embodiments, the AF top end stop portions 810 may be components that are attached to the coil holder 802. For example, the AF top end stop portions 810 may be sheet metal components that are attached to the coil holder 802. In some embodiments, the AF top end stop portions 810 may include a first AF top end stop portion 810*a* and a second AF top end stop portion 810*b*. The lens carrier 804 may include corresponding AF top end stop portions 812. In some embodiments, the corresponding AF top end stop portions 812 may include a first corresponding AF top end stop portion 812*a* and a second corresponding AF top end stop portion (not shown, but the second corresponding AF top end stop portion may be functionally and/or structurally similar to, or the same as, the first corresponding AF top end stop portion 812*a*). In some embodiments, the second corresponding AF top end stop portion may be positioned relative to the second AF top end stop portion 810*b* of the coil holder 802 similar to, or the same as, the way the first corresponding AF top end stop portion 812*a* is positioned relative to the first AF top end stop portion 810*a*.

Figure 9B:
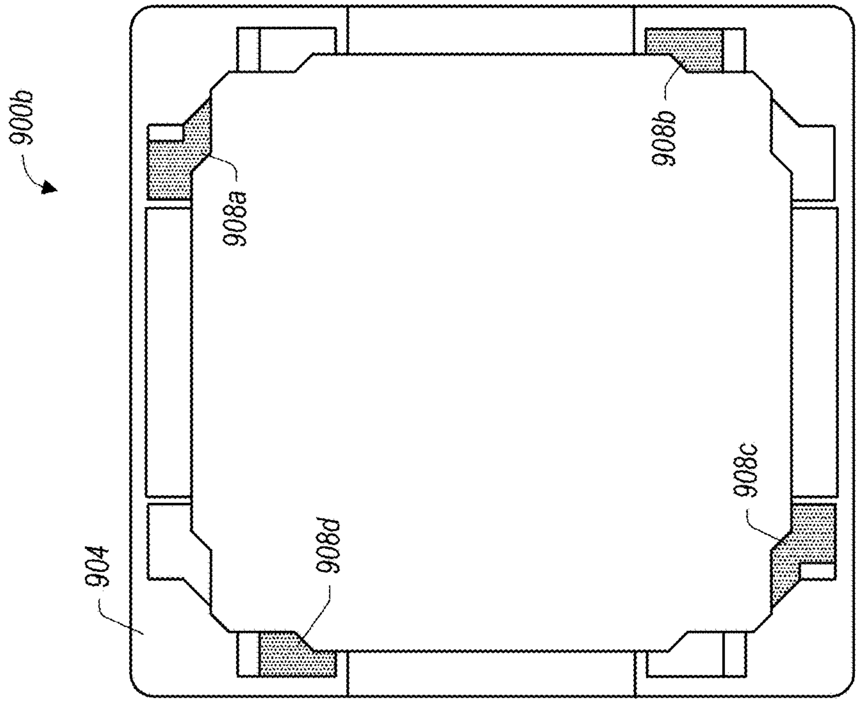
FIGS. 9A-9C illustrate views of example OIS end stops that may be used in a camera system having one or more SMA actuators, in accordance with some embodiments.
Figure 9A:
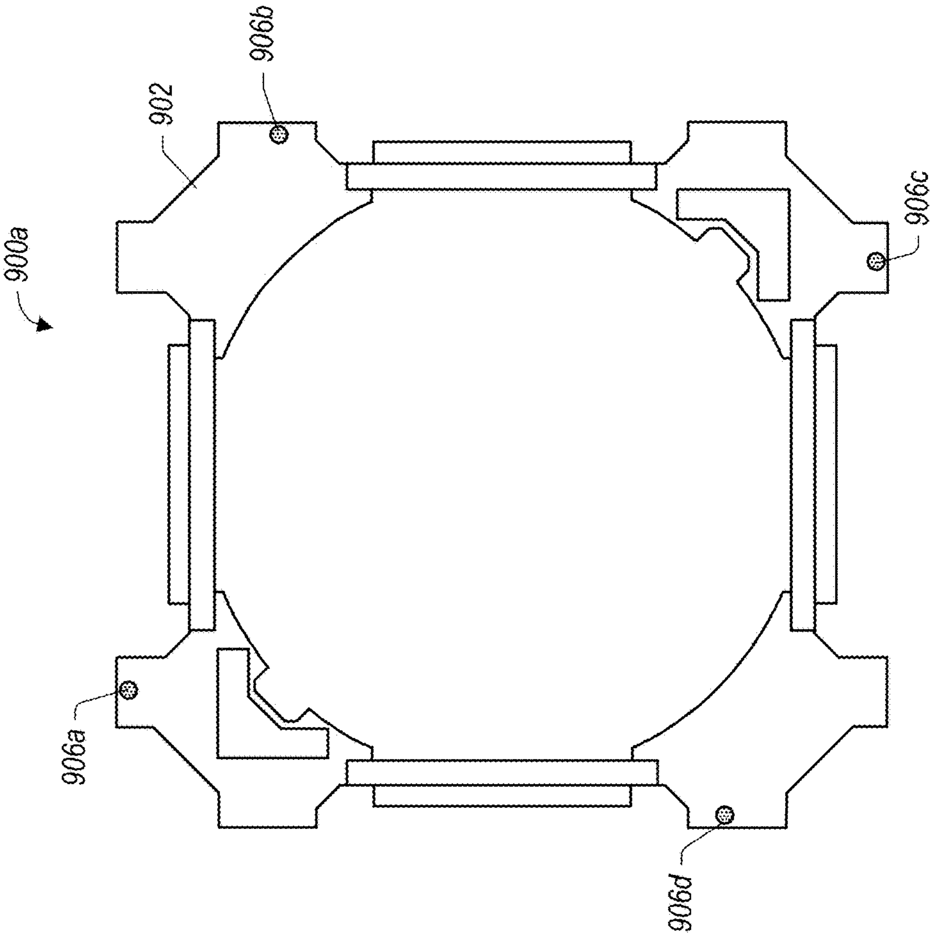
Figure 9C:
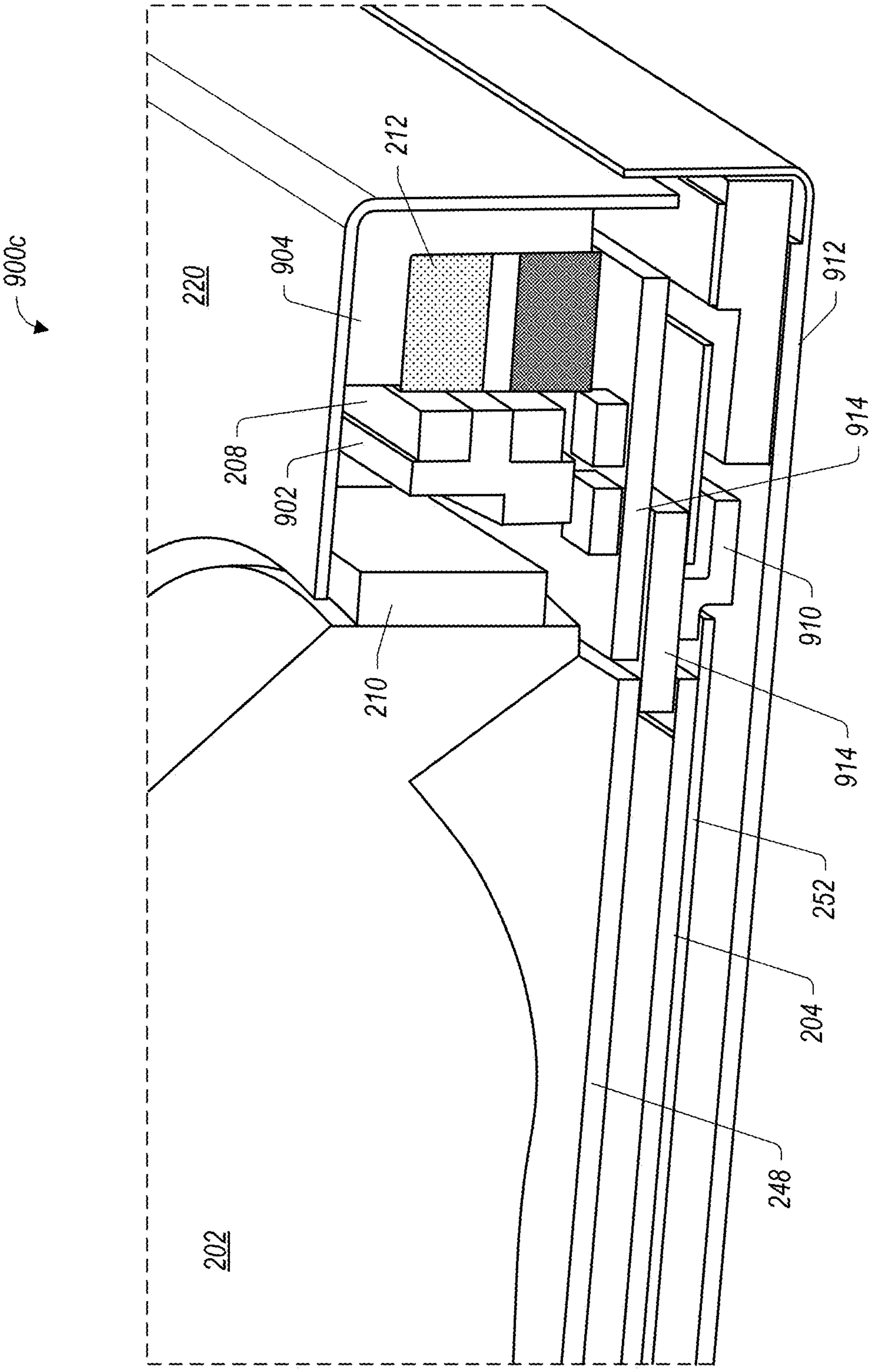

FIGS. 9A-9C illustrate views 900 of example OIS end stops that may be used in a camera system having one or more SMA actuators, in accordance with some embodiments. FIG. 9A shows a cross-sectional top view 900*a* of a portion of an OIS top end stop. FIG. 9B shows a cross-sectional bottom view 900*b* of another portion of the OIS top end stop. FIG. 9C shows a cross-sectional perspective view 900*c* of at least a portion of an OIS bottom end stop.

As indicated in FIGS. 9A-9B, the OIS top end stop may be defined, at least in part, by a coil holder 902 and a magnet holder 904 of a camera system (e.g., camera system 100 in FIG. 1A). For example, the coil holder 902 may include OIS top end stop portions 906. In some embodiments, the OIS top end stop portions 906 may include a first OIS top end portion 906*a*, a second OIS top end stop portion 906*b*, a third OIS top end portion 906*c*, and a fourth OIS top end portion 906*d*. The magnet holder 904 may include corresponding OIS top end stop portions 908. In some embodiments, the corresponding OIS top end portions 908 may include a first corresponding OIS top end portion 908*a*, a second corresponding OIS top end portion 908*b*, a third corresponding OIS top end portion 908*c*, and a fourth corresponding OIS top end portion 908*d*.

According to various embodiments, when a side of the coil holder 902 tilts (e.g., due to OIS actuation as discussed herein with reference to FIG. 1A) toward the magnet holder 904, an OIS top end portion 906 at that side of the coil holder 902 may move toward a corresponding OIS top end portion 908 at a corresponding side of the magnet holder 904. The corresponding OIS top end portion 908 may provide an upper limit to the coil holder's 902 tilt in the direction of the magnet holder 904, as the OIS top end portion 906 of the coil holder 902 would be stopped from any further tilt motion once it reaches/contacts the corresponding OIS top end portion 908 of the magnet holder 904.

As indicated in FIG. 9C, the OIS bottom end stop may be formed, at least in part, by one or more fenders 910 and a lower enclosure 912 (which may be similar to, or the same as, lower enclosure 246 in FIGS. 2B-2C in some embodiments). In some embodiments, the fender(s) 910 may be coupled with a substrate 914 (which may be similar to, or the same as, substrate 216 in FIGS. 2B-2C in some embodiments). For example, a fender 910 may be attached to a bottom surface of the substrate 914, e.g., as indicated in FIG. 9C.

According to various embodiments, when a side of the substrate 914 tilts (e.g., due to OIS actuation as discussed herein with reference to FIG. 1A) toward the lower enclosure 912, one or more fenders 910 at that side of the substrate 914 may also move toward the lower enclosure 912. The lower enclosure 912 may provide a lower limit to the substrate's 914 tilt in the direction of the lower enclosure 912, as the fender(s) 910 coupled with the substrate 914 would be stopped from any further tilt motion once it reaches/contacts the lower enclosure 912.

Figure 10:
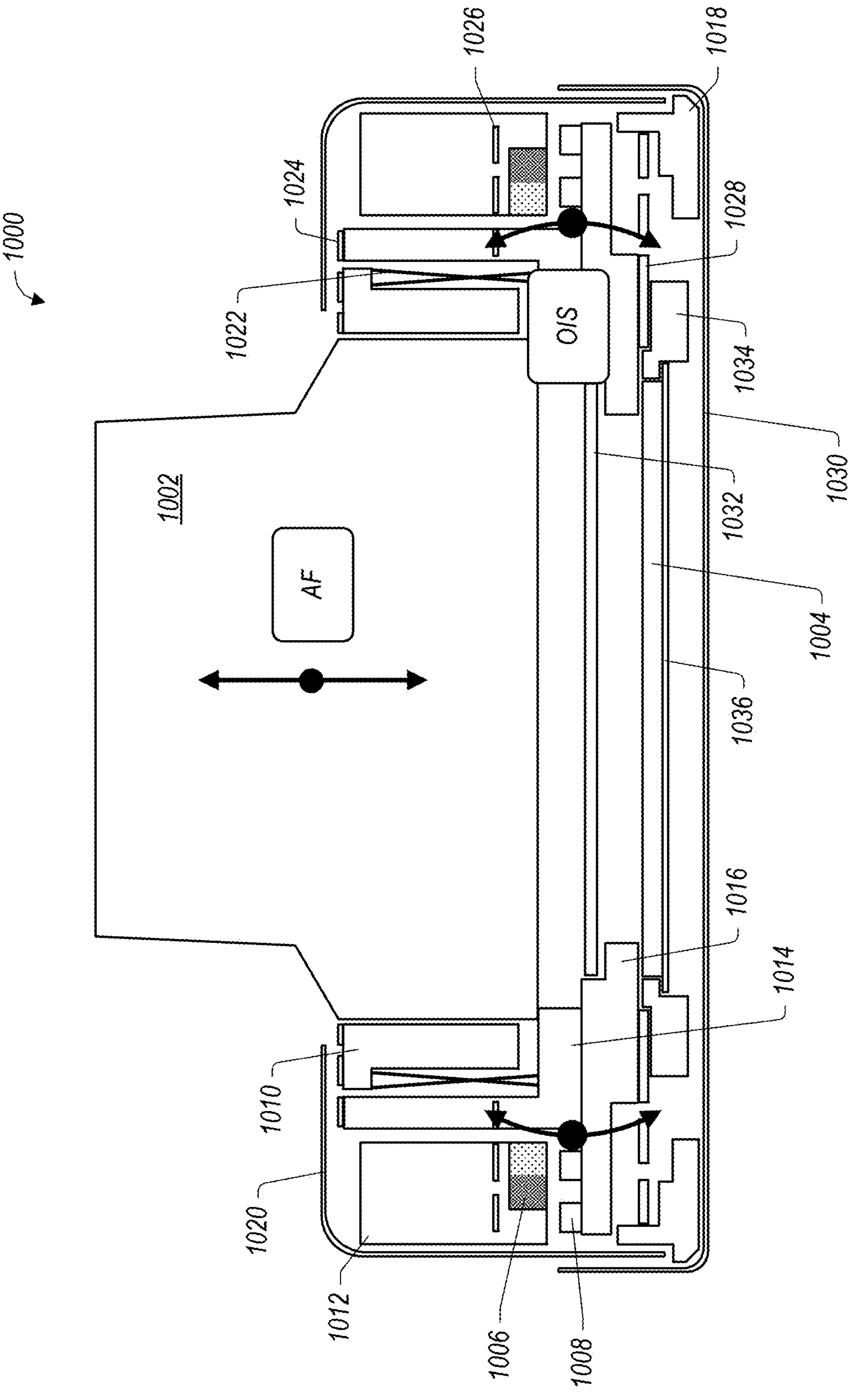
FIG. 10 illustrates a cross-sectional side view of an example camera system that may include one or more SMA actuators, in accordance with some embodiments. In some embodiments, the camera system may have a single pole magnet layout.

FIG. 10 illustrates a cross-sectional side view of an example camera system 1000 that may include one or more SMA actuators, in accordance with some embodiments. As will be discussed in further detail herein, the camera system 1000 may have a single pole magnet layout, e.g., as compared to the dual pole magnet layout described herein with reference to at least FIGS. 1-2B and 5A.

In some embodiments, the camera system 1000 may include a lens group 1002, an image sensor 1004, one or more actuator arrangements, and/or one or more suspension arrangements. The actuator arrangement(s) may include an AF SMA actuator and an OIS VCM actuator (e.g., comprising the single pole magnet layout). In various embodiments, the AF SMA actuator may be configured to move the lens group 1002, relative to the image sensor 1004, in directions parallel to an optical axis (e.g., optical axis 106 in FIG. 1A) of the camera system 1000. Furthermore, the OIS VCM actuator may be configured to tilt the lens group 1002, together with the image sensor 1004, about multiple axes orthogonal to the optical axis.

In some embodiments, the OIS VCM actuator may include OIS drive magnets 1006 and OIS drive coils 1008. As previously mentioned, the OIS VCM actuator of camera system 1000 may comprise a single pole magnet layout, so the OIS drive magnets 1006 may be single pole magnets. Furthermore, the camera system 1000 may include a lens carrier 1010, a magnet holder 1012, an AF base 1014, a substrate 1016, a base structure 1018, and/or a shield can 1020. The image sensor 1004 may be coupled with the substrate 1016. Furthermore, the substrate 1016 may be coupled with the OIS drive coils 1008 and the AF base 1014, e.g., such that the image sensor 1004 is movable together with the substrate 1016, the OIS drive coils 1008, and the AF base 1014. In various embodiments, the magnet holder 1012 may be coupled with the base structure 1018 and/or the shield can 1020. The magnet holder 1012, the base structure 1018, and the shield can 1020 may be stationary components of the camera system 1000 in various embodiments.

According to some embodiments, the OIS drive magnets 1006 may be coupled with the magnet holder 1012, e.g., as indicated in FIG. 10. The OIS drive coils 1008 may be coupled with the substrate 1016, e.g., as indicated in FIG. 10. In various embodiments, a respective OIS drive coil 1008 may be positioned proximate a respective OIS drive magnet 1006, e.g., such that, when driven with electric current, the respective OIS drive coil 1008 is capable of electromagnetically interacting with the respective OIS drive magnet 1006 to tilt the substrate 1016 (and the image sensor 1004 and the AF base 1014 coupled therewith), together with the lens carrier 1010 (and the lens group 1002 coupled therewith), about multiple axes orthogonal to the optical axis. In this manner, the OIS VCM actuator may be configured to enable OIS tilt motion of the lens group 1002 together with the image sensor 1004.

In various embodiments, the AF SMA actuator may include SMA wires 1022 configured to move the lens group 1002, relative to the image sensor 1004, in directions parallel to the optical axis. The SMA wires 1022 may be coupled with the lens carrier 1010 and the AF base 1014, e.g., as indicated in FIG. 10. In some non-limiting embodiments, the SMA wires 1022 may be arranged in multiples (e.g., in multiple pairs), e.g., as discussed herein with reference to FIG. 1A. According to various embodiments, the SMA wires 1022 may generally be arranged and/or function like the SMA wires 124 described herein with reference to FIGS. 1A-1D.

According to some embodiments, the suspension arrangement(s) of the camera system 1000 may include a spring suspension arrangement and/or a flexure suspension arrangement. In some embodiments, the spring suspension arrangement may include an upper spring 1024 and/or a lower spring 1026.

In some embodiments, the upper spring 1024 may be coupled with the lens carrier 1010 and the AF base 1014. For example, a first portion of the upper spring 1024 may be attached to the lens carrier 1010, and a second portion of the upper spring 1024 may be attached to the AF base 1014. According to various embodiments, the upper spring 1024 may suspend the lens group 1002 from the AF base 1014 and allow motion of the lens group 1002 and/or the image sensor 1004 enabled by the actuator arrangement(s).

In some embodiments, the lower spring 1026 may be coupled with the AF base 1014 and the magnet holder 1012. For example, a first portion of the of the lower spring 1026 may be attached to the AF base 1014, and a second portion of the lower spring 1026 may be attached to the magnet holder 1012. According to various embodiments, the lower spring 1026 may suspend the AF base 1014 from the magnet holder 1012 and allow motion of the lens group 1002 enabled by the actuator arrangement(s).

According to some embodiments, the flexure suspension arrangement may include a flexure 1028. In some non-limiting embodiments, the flexure 1028 may include an inner frame (e.g., inner frame 132 in FIG. 1A), an outer frame (e.g., outer frame 134 in FIG. 1A), and one or more flexure arms (e.g., flexure arm(s) 136 in FIG. 1A) that extend from the inner frame to the outer frame. The inner frame may be coupled with the substrate 1016. The outer frame may be coupled with one or more stationary structures (e.g., the base structure 1018) of the camera system 1000. In some embodiments, the flexure 1028 and/or the flexure arm(s) may be configured to provide sufficient stiffness to suspend the image sensor 1004 from the stationary structure(s) and avoid undesired motion, while also providing sufficient compliance to enable intended motion caused by the OIS VCM actuator. Furthermore, as discussed herein with reference to FIG. 1A, the flexure 1028 and/or the flexure arm(s) may be used to route/convey electrical signals between components of the camera system 1000.

According to some embodiments, the camera system 1000 may include a lower enclosure 1030, an optical filter 1032 (e.g., an infrared cut-off filter (IRCF)), and/or a fender 1034. The shield can 1020 and the lower enclosure 1030 may encase at least a portion of the camera system 1000. In some non-limiting embodiments, the shield can 1020 may encase a first portion (e.g., an upper portion) and the lower enclosure 1030 may encase a second portion (e.g., a lower portion). As indicated in FIG. 10, a portion of the lower enclosure 1030 may overlap with a portion of the shield can 1020 in some embodiments.

The optical filter 1032 may be coupled with the substrate 1016. Furthermore, the optical filter 1032 may be positioned above the image sensor 1004, e.g., such that light passes through the optical filter 1032 before it reaches the image sensor 1004. As discussed herein with reference to FIG. 9C, the fender 1034 may form at least a portion of an end stop of the camera system 1000. For example, the fender 1034 and the lower enclosure 1030 may form at least a portion of an OIS bottom end stop. Furthermore, the camera system 1000 may include a stiffener 1036 in various embodiments. For example, the stiffener 1036 may be positioned below the image sensor 1004 and may provide structural support to the image sensor 1004.

Figure 11A:
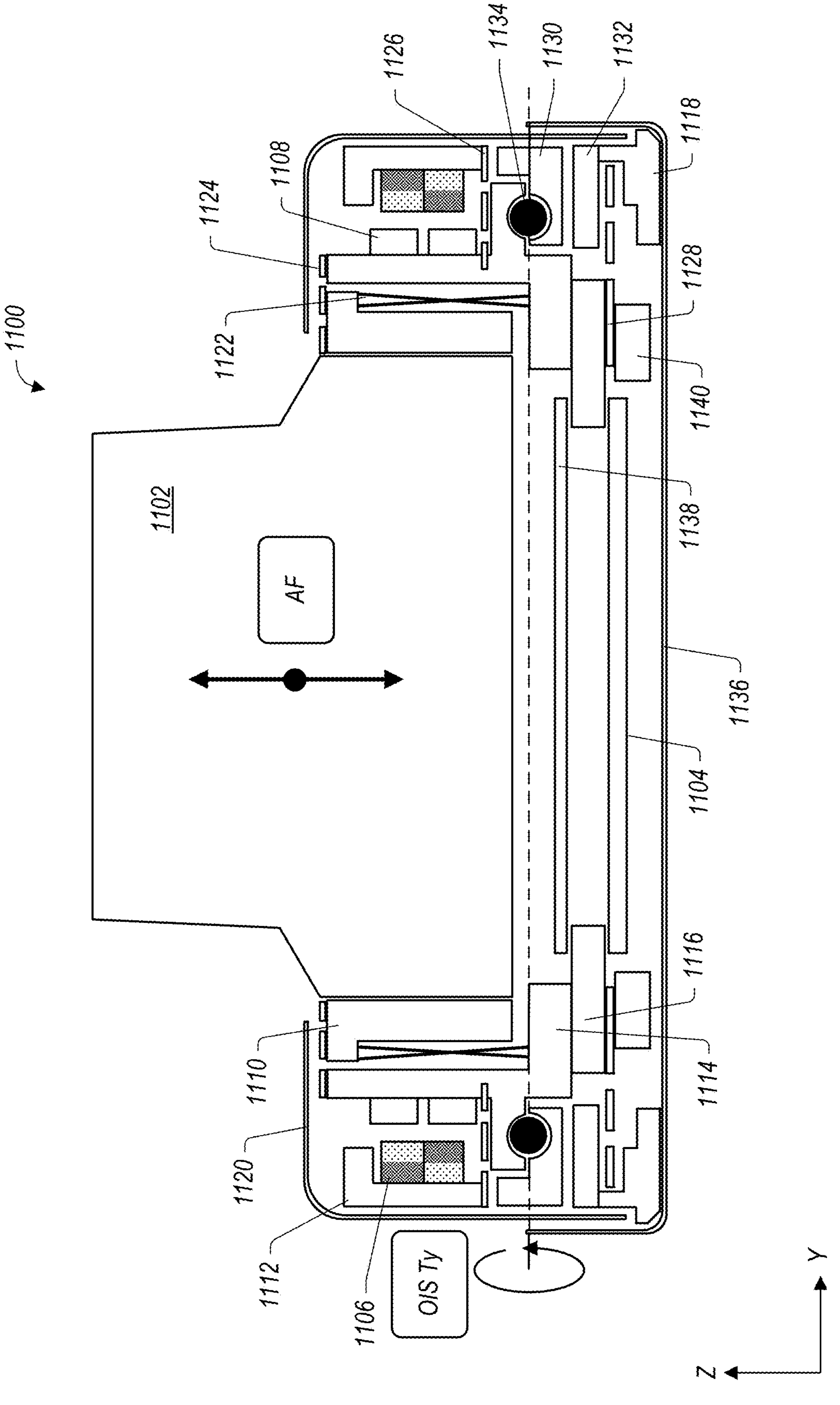
FIGS. 11A-11B illustrate views of another example camera system that may include one or more SMA actuators, in accordance with some embodiments.
Figure 11B:
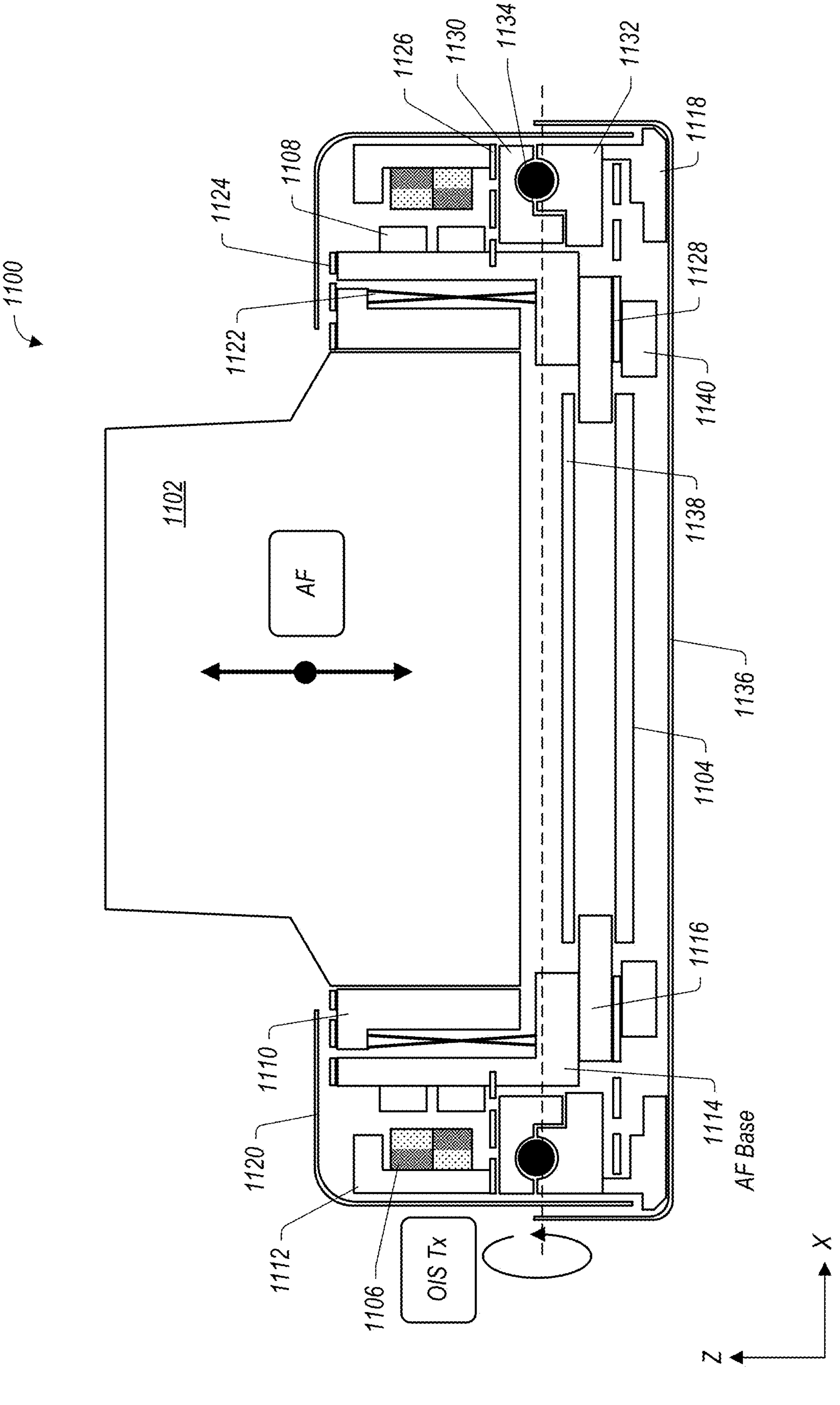

FIGS. 11A-11B illustrate views of another example camera system 1100 that may include one or more SMA actuators, in accordance with some embodiments. FIG. 11A shows a cross-sectional side view of the camera system 1100. FIG. 11B shows another cross-sectional side view of the camera system 1100. As will be discussed in further detail herein, the camera system 1100 may include a ball bearing suspension arrangement.

In some embodiments, the camera system 1100 may include a lens group 1102, an image sensor 1104, one or more actuator arrangements, and/or one or more suspension arrangements (e.g., including the ball bearing suspension arrangement). The actuator arrangement(s) may include an AF SMA actuator and an OIS VCM actuator. In various embodiments, the AF SMA actuator may be configured to move the lens group 1102, relative to the image sensor 1104, in directions parallel to an optical axis (e.g., optical axis 106 in FIG. 1A) of the camera system 1100. Furthermore, the OIS VCM actuator may be configured to tilt the lens group 1102, together with the image sensor 1104, about multiple axes orthogonal to the optical axis.

In some embodiments, the OIS VCM actuator may include OIS drive magnets 1106 and OIS drive coils 1108. Furthermore, the camera system 1100 may include a lens carrier 1110, a magnet holder 1112, an AF base 1114 (which may also function as a coil holder), a substrate 1116, a base structure 1118, and/or a shield can 1120. The image sensor 1104 may be coupled with the substrate 1116. The substrate 1116 may be coupled with the AF base 1114 (which may be coupled with the OIS drive coils 1108), e.g., such that the image sensor 1104 is movable together with the substrate 1116, the AF base 1114, and the OIS drive coils 1108. In various embodiments, the magnet holder 1112 may be coupled with the shield can 1120 and/or the base structure 1118. The magnet holder 1112, the base structure 1118, and the shield can 1120 may be stationary components of the camera system 1100 in various embodiments.

According to some embodiments, the OIS drive magnets 1106 may be coupled with the magnet holder 1112, e.g., as indicated in FIGS. 11A-11B. The OIS drive coils 1108 may be coupled with the AF base 1114. In various embodiments, a respective OIS drive coil 1108 may be positioned proximate a respective OIS drive magnet 1106, e.g., such that, when driven with electric current, the respective OIS drive coil 1108 is capable of electromagnetically interacting with the respective OIS drive magnet 1106 to tilt the AF base 1114 (and the substrate 1116 and the image sensor 1104 coupled therewith), about multiple axes orthogonal to the optical axis. In this manner, the OIS VCM actuator may be configured to enable OIS tilt motion of the lens group 1102 together with the image sensor 1104.

In various embodiments, the AF SMA actuator may include SMA wires 1122 configured to move the lens group 1102, relative to the image sensor 1104, in directions parallel to the optical axis. The SMA wires 1122 may be coupled with the lens carrier 1110 and the AF base 1114, e.g., as indicated in FIGS. 11A-11B. In some non-limiting embodiments, the SMA wires 1122 may be arranged in multiples (e.g., in multiple pairs), e.g., as discussed herein with reference to FIG. 1A. According to various embodiments, the SMA wires 1122 may generally be arranged and/or function like the SMA wires 124 described herein with reference to FIGS. 1A-1D.

According to some embodiments, the suspension arrangement(s) of the camera system 1100 may include a spring suspension arrangement, a flexure suspension arrangement, and/or a ball bearing suspension arrangement. In some embodiments, the spring suspension arrangement may include an upper spring 1124 and/or a lower spring 1126.

In some embodiments, the upper spring 1124 may be coupled with the lens carrier 1110 and the AF base 1114. For example, a first portion of the upper spring 1124 may be attached to the lens carrier 1110, and a second portion of the upper spring 1124 may be attached to the AF base 1114. According to various embodiments, the upper spring 1124 may suspend the lens group 1102 from the AF base 1114 and allow motion of the lens group 1102 and/or the image sensor 1104 enabled by the actuator arrangement(s).

In some embodiments, the lower spring 1126 maybe coupled with the AF base 1114 and the magnet holder 1112. For example, a first portion of the lower spring 1126 may be attached to the AF base 1114, and a second portion of the lower spring 1126 may be attached to the magnet holder 1112. According to various embodiments, the lower spring 1126 may suspend the AF base 1114 from the magnet holder 1112 and allow motion of the lens group 1102 enabled by the actuator arrangement(s).

According to some embodiments, the flexure suspension arrangement may include a flexure 1128. In some non-limiting embodiments, the flexure 1128 may include an inner frame (e.g., inner frame 132 in FIG. 1A), an outer frame (e.g., outer frame 134 in FIG. 1A), and one or more flexure arms (e.g., flexure arm(s) 136 in FIG. 1A) that extend from the inner frame to the outer frame. The inner frame may be coupled with the substrate 1116. The outer frame may be coupled with one or more stationary structures (e.g., the base structure 1118) of the camera system 1100. In some embodiments, the flexure 1128 and/or the flexure arm(s) may be configured to provide sufficient stiffness to suspend the image sensor 1104 from the stationary structure(s) and avoid undesired motion, while also providing sufficient compliance to enable intended motion caused by the OIS VCM actuator. Furthermore, as discussed herein with reference to FIG. 1A, the flexure 1128 and/or the flexure arm(s) may be used to route/convey electrical signals between components of the camera system 1100.

In various embodiments, the ball bearing suspension arrangement may include multiple stages that move on ball bearings to suspend the lens group 1102 and the image sensor 1104 and to allow motion enabled by the OIS VCM actuator. In some non-limiting embodiments, the ball bearing suspension arrangement may include the AF base 1114, a tilt frame 1130, a tilt base 1132, and ball bearings 1134, e.g., as indicated in FIGS. 11A-11B. A first portion of the ball bearings 1134 may be positioned between the AF base 1114 and the tilt frame 1130, e.g., as indicated in the cross-sectional view shown in FIG. 11A. A second portion of the ball bearings 1134 may be positioned between the tilt frame 1130 and the tilt base 1132, e.g., as indicated in the cross-sectional view shown in FIG. 11B.

According to some embodiments, one or more of the OIS drive coils 1108 shown in FIG. 11B may be activated with a drive current to produce the OIS Ty tilt motion (tilt about the Y-axis, for example) indicated in FIG. 11A. Such Ty tilt motion may be enabled by the AF base 1114 pivoting on the first portion of the ball bearings 1134 in FIG. 11A in some non-limiting embodiments. Similarly, one of more of the OIS drive coils 1108 shown in FIG. 11A may be activated with a drive current to produce OIS Tx tilt motion (tilt about the X-axis, for example) indicated in FIG. 11B. Such Tx tilt motion may be enabled by the tilt frame 1130 pivoting on the second portion of the ball bearings 1134 in FIG. 11B in some non-limiting embodiments.

According to some embodiments, the camera system 1100 may include a lower enclosure 1136, an optical filter 1138 (e.g., an infrared cut-off filter (IRCF)), and/or a fender 1140. The shield can 1120 and the lower enclosure 1136 may encase at least a portion of the camera system 1100. In some non-limiting embodiments, the shield can 1120 may encase a first portion (e.g., an upper portion) and the lower enclosure 1136 may encase a second portion (e.g., a lower portion). As indicated in FIGS. 11A-11B, a portion of the lower enclosure 1136 may overlap with a portion of the shield can 1120 in some embodiments.

The optical filter 1138 may be coupled with the substrate 1116. Furthermore, the optical filter 1138 may be positioned above the image sensor 1104, e.g., such that light passes through the optical filter 1138 before it reaches the image sensor 1104. As discussed herein with reference to FIG. 9C, the fender 1140 may form at least a portion of an end stop of the camera system 1100. For example, the fender 1140 and the lower enclosure 1136 may form at least a portion of an OIS bottom end stop.

Figure 12A:
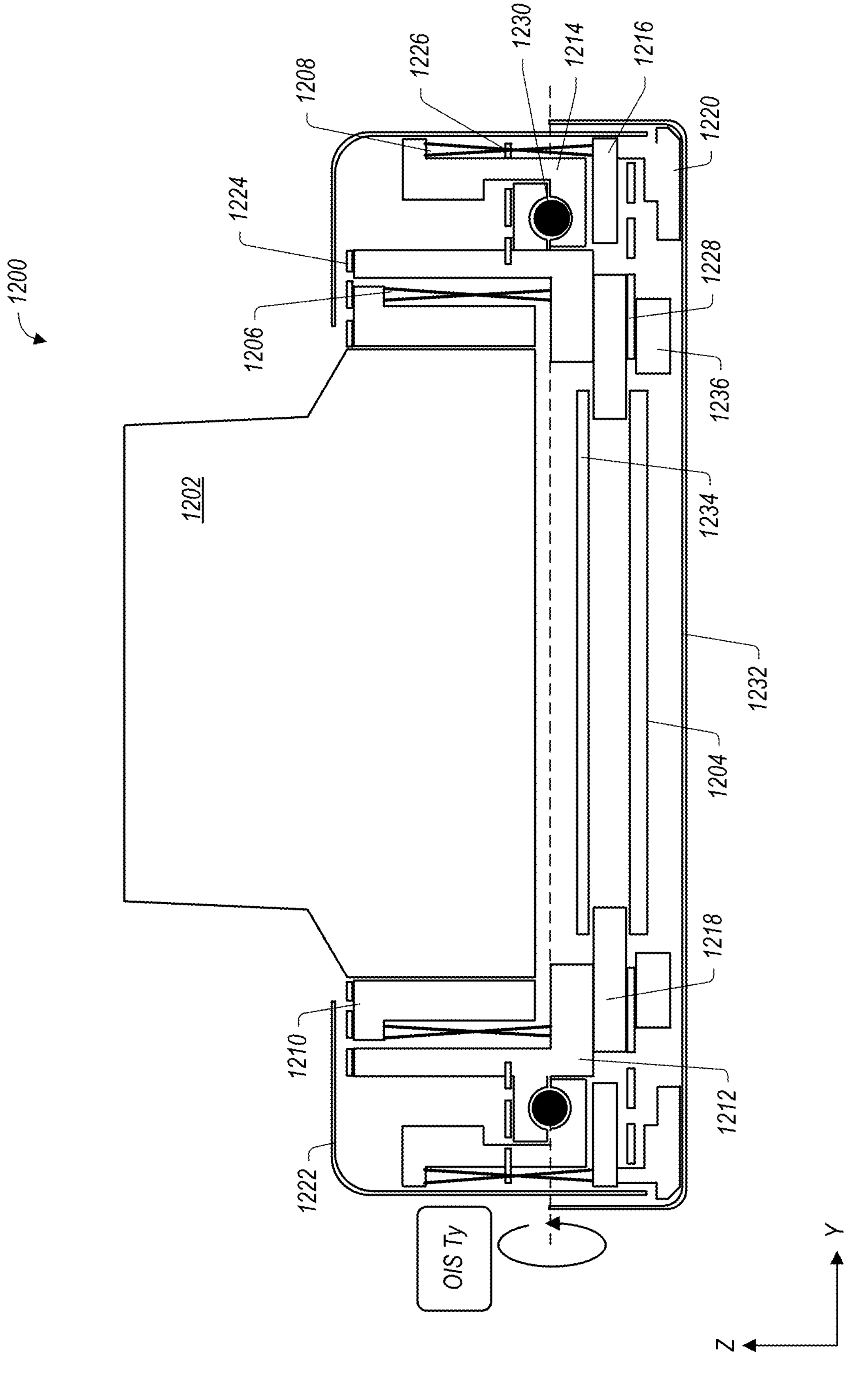
FIGS. 12A-12B illustrate views of yet another example camera system that may include one or more SMA actuators, in accordance with some embodiments.
Figure 12B:
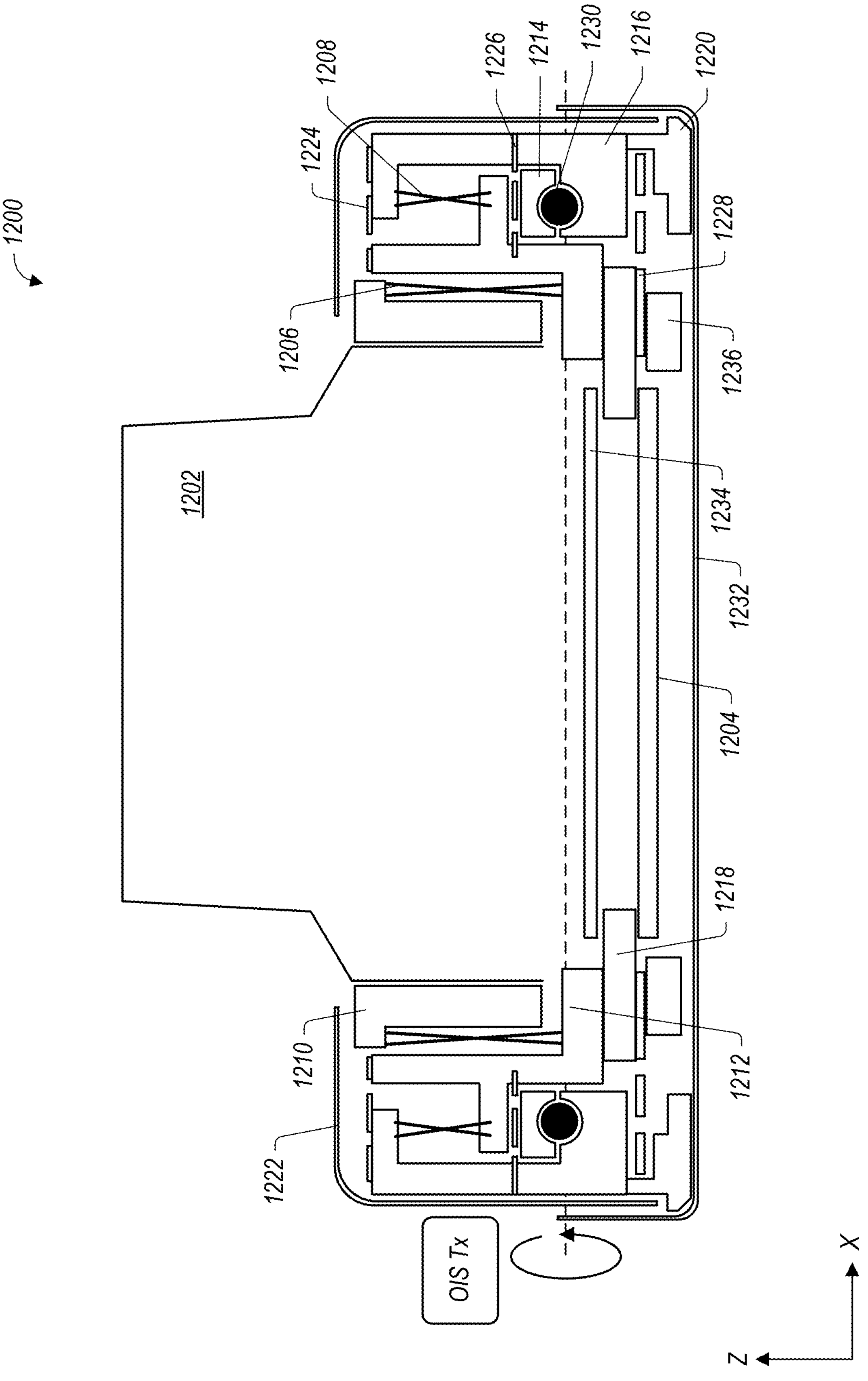

FIGS. 12A-12B illustrate views of yet another example camera system 1200 that may include one or more SMA actuators, in accordance with some embodiments. FIG. 12A shows a cross-sectional side view of the camera system 1200. FIG. 12B shows another cross-sectional side view of the camera system 1200. As will be discussed in further detail herein, the camera system 1200 may include an AF SMA actuator and an OIS SMA actuator in various embodiments.

In some embodiments, the camera system 1200 may include a lens group 1202, an image sensor 1204, one or more actuator arrangements, and/or one or more suspension arrangements. As previously mentioned, the actuator arrangement(s) may include an AF SMA actuator and an OIS SMA actuator. In various embodiments, the AF SMA actuator may be configured to move the lens group 1202, relative to the image sensor 1204, in directions parallel to an optical axis (e.g., optical axis 106 in FIG. 1A) of the camera system 1200. Furthermore, the OIS SMA actuator may be configured to tilt the lens group 1202, together with the image sensor 1204, about multiple axes orthogonal to the optical axis.

According to various embodiments, the AF SMA actuator may include a first set of SMA wires 1206, and the OIS SMA actuator may include a second set of SMA wires 1208. Furthermore, the camera system 1200 may include a lens carrier 1210, an AF base 1212, a tilt frame 1214, a tilt base 1216, a substrate 1218, a base structure 1220, and/or a shield can 1222. The first set of SMA wires 1206 of the AF SMA actuator may be configured to move the lens group 1204, relative to the image sensor 1204, in directions parallel to the optical axis. The first set of SMA wires 1206 may be coupled with the lens carrier 1210 and the AF base 1212, e.g., as indicated in FIGS. 12A-12B. In some non-limiting embodiments, the first set of SMA wires 1206 may be arranged in multiples (e.g., in multiple pairs), e.g., as discussed herein with reference to FIG. 1A. According to various embodiments, the SMA wires 1206 may generally be arranged and/or function like the SMA wires 124 described herein with reference to FIGS. 1A-1D.

In some embodiments, the second set of SMA wires 1208 of the OIS SMA actuator may be configured to configured to tilt the lens group 1202, together with the image sensor 1204, about multiple axes orthogonal to the optical axis. A portion of the second set of SMA wires 1208 may be coupled with the tilt frame 1214 and the tilt base 1216, e.g., as indicated in the cross-sectional view shown in FIG. 12A. Furthermore, a portion of the second set of SMA wires 1208 may be coupled with the tilt base 1216 and the AF base 1212, e.g., as indicated in the cross-sectional view shown in FIG. 12B. In some non-limiting embodiments, the second set of SMA wires 1208 may be arranged in multiples (e.g., in multiple pairs). As a non-limiting example, the second set of SMA wires 1208 may include a first pair of SMA wires 1208 at a first side of the camera system 1200, a second pair of SMA wires 1208 at a second side of the camera system 1200 opposite the first side, a third pair of SMA wires 1208 at a third side of the camera system 1200, and a fourth pair of SMA wires 1208 at a fourth side of the camera system 1200 opposite the third side. According to various embodiments, the SMA wires 1208 may generally be arranged and/or function according to aspects described herein with reference to SMA wires 124 in FIGS. 1A-1D.

According to some embodiments, the suspension arrangement(s) of the camera system 1200 may include a spring suspension arrangement, a flexure suspension arrangement, and/or a ball bearing suspension arrangement. In some embodiments, the spring suspension arrangement may include one or more upper springs 1224 and/or one or more lower springs 1226.

In some embodiments, a portion of the upper spring(s) 1224 may be coupled with the lens carrier 1210 and the AF base 1212, e.g., as indicated in FIG. 12A. Additionally, or alternatively, a portion of the upper spring(s) 1224 may be coupled with the AF base 1212 and the tilt base 1216, e.g., as indicated in FIG. 12B. According to various embodiments, the upper spring(s) 1224 may suspend the lens group 1202 from the AF base 1212 and/or the tilt base 1216 and allow motion of the lens group 1202 and/or the image sensor 1204 enabled by the actuator arrangement(s).

In some embodiments, the lower spring(s) 1226 maybe coupled with the AF base 1212 and the tilt base 1216. For example, a first portion of the lower spring(s) 1226 may be attached to the AF base 1212, and a second portion of the lower spring(s) 1226 may be attached to the tilt base 1216. According to various embodiments, the lower spring(s) 1226 may suspend the AF base 1212 from the tilt base 1216 and allow motion of the lens group 1204 enabled by the actuator arrangement(s).

According to some embodiments, the flexure suspension arrangement may include a flexure 1228. In some non-limiting embodiments, the flexure 1228 may include an inner frame (e.g., inner frame 132 in FIG. 1A), an outer frame (e.g., outer frame 134 in FIG. 1A), and one or more flexure arms (e.g., flexure arm(s) 136 in FIG. 1A) that extend from the inner frame to the outer frame. The inner frame may be coupled with the substrate 1218. The outer frame may be coupled with one or more stationary structures (e.g., the base structure 1220) of the camera system 1200. In some embodiments, the flexure 1228 and/or the flexure arm(s) may be configured to provide sufficient stiffness to suspend the image sensor 1204 from the stationary structure(s) and avoid undesired motion, while also providing sufficient compliance to enable intended motion caused by the OIS SMA actuator. Furthermore, as discussed herein with reference to FIG. 1A, the flexure 1228 and/or the flexure arm(s) may be used to route/convey electrical signals between components of the camera system 1200.

In various embodiments, the ball bearing suspension arrangement may include multiple stages that move on ball bearings to suspend the lens group 1202 and the image sensor 1204 and to allow motion enabled by the OIS SMA actuator. In some non-limiting embodiments, the ball bearing suspension arrangement may include the AF base 1212, the tilt frame 1214, the tilt base 1216, and ball bearings 1230, e.g., as indicated in FIGS. 12A-12B. A first portion of the ball bearings 1230 may be positioned between the AF base 1212 and the tilt frame 1214, e.g., as indicated in the cross-sectional view shown in FIG. 12A. A second portion of the ball bearings 1230 may be positioned between the tilt frame 1214 and the tilt base 1216, e.g., as indicated in the cross-sectional view shown in FIG. 12B.

According to some embodiments, one or more of the OIS SMA wires 1208 shown in FIG. 12B may be activated to produce the OIS Ty tilt motion (tilt about the Y-axis, for example) indicated in FIG. 12A. Such Ty tilt motion may be enabled by the AF base 1212 pivoting on the first portion of the ball bearings 1230 in FIG. 12A in some non-limiting embodiments. Similarly, one of more of the OIS SMA wires 1208 shown in FIG. 12A may be activated to produce OIS Tx tilt motion (tilt about the X-axis, for example) indicated in FIG. 12B. Such Tx tilt motion may be enabled by the tilt frame 1214 pivoting on the second portion of the ball bearings 1230 in FIG. 12B in some non-limiting embodiments.

According to some embodiments, the camera system 1200 may include a lower enclosure 1232, an optical filter 1234 (e.g., an infrared cut-off filter (IRCF)), and/or a fender 1236. The shield can 1222 and the lower enclosure 1232 may encase at least a portion of the camera system 1200. In some non-limiting embodiments, the shield can 1222 may encase a first portion (e.g., an upper portion) and the lower enclosure 1232 may encase a second portion (e.g., a lower portion). As indicated in FIGS. 12A-12B, a portion of the lower enclosure 1232 may overlap with a portion of the shield can 1222 in some embodiments.

The optical filter 1234 may be coupled with the substrate 1218. Furthermore, the optical filter 1234 may be positioned above the image sensor 1204, e.g., such that light passes through the optical filter 1234 before it reaches the image sensor 1204. As discussed herein with reference to FIG. 9C, the fender 1236 may form at least a portion of an end stop of the camera system 1200. For example, the fender 1236 and the lower enclosure 1232 may form at least a portion of an OIS bottom end stop.

Figure 13:
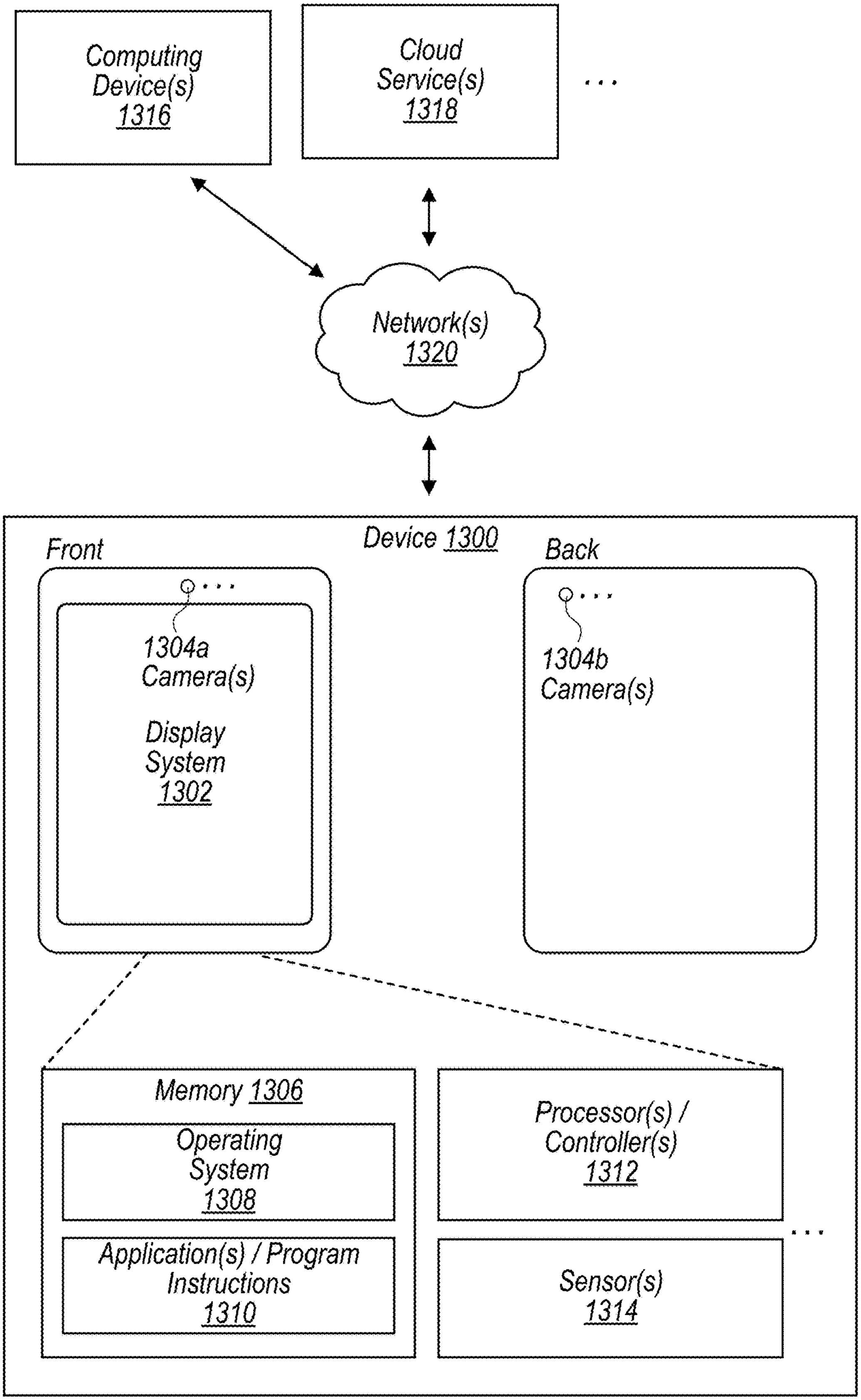
FIG. 13 illustrates a schematic representation of an example environment comprising a device that may include one or more cameras having one or more SMA actuators, in accordance with some embodiments.

FIG. 13 illustrates a schematic representation of an example environment comprising a device 1300 that may include one or more cameras. For example, the device 1300 may include a camera system having one or more SMA actuators, e.g., as described herein with reference to FIGS. 1A-12B. In some embodiments, the device 1300 may be a mobile device and/or a multifunction device. In various embodiments, the device 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1300 may include a display system 1302 (e.g., comprising a display and/or a touch-sensitive surface) and/or one or more cameras 1304. In some non-limiting embodiments, the display system 1302 and/or one or more front-facing cameras 1304*a* may be provided at a front side of the device 1300, e.g., as indicated in FIG. 13. Additionally, or alternatively, one or more rear-facing cameras 1304*b* may be provided at a rear side of the device 1300. In some embodiments comprising multiple cameras 1304, some or all of the cameras 1304 may be the same as, or similar to, each other. Additionally, or alternatively, some or all of the cameras 1304 may be different from each other. In various embodiments, the location(s) and/or arrangement(s) of the camera(s) 1304 may be different than those indicated in FIG. 13.

Among other things, the device 1300 may include memory 1306 (e.g., comprising an operating system 1308 and/or application(s)/program instructions 1310), one or more processors and/or controllers 1312 (e.g., comprising CPU(s), memory controller(s), display controller(s), and/or camera controller(s), etc.), and/or one or more sensors 1314 (e.g., orientation sensor(s), proximity sensor(s), and/or position sensor(s), etc.). In some embodiments, the device 1300 may communicate with one or more other devices and/or services, such as computing device(s) 1316, cloud service(s) 1318, etc., via one or more networks 1320. For example, the device 1300 may include a network interface (e.g., network interface 1410 in FIG. 14) that enables the device 1300 to transmit data to, and receive data from, the network(s) 1320. Additionally, or alternatively, the device 1300 may be capable of communicating with other devices via wireless communication using any of a variety of communications standards, protocols, and/or technologies.

Figure 14:
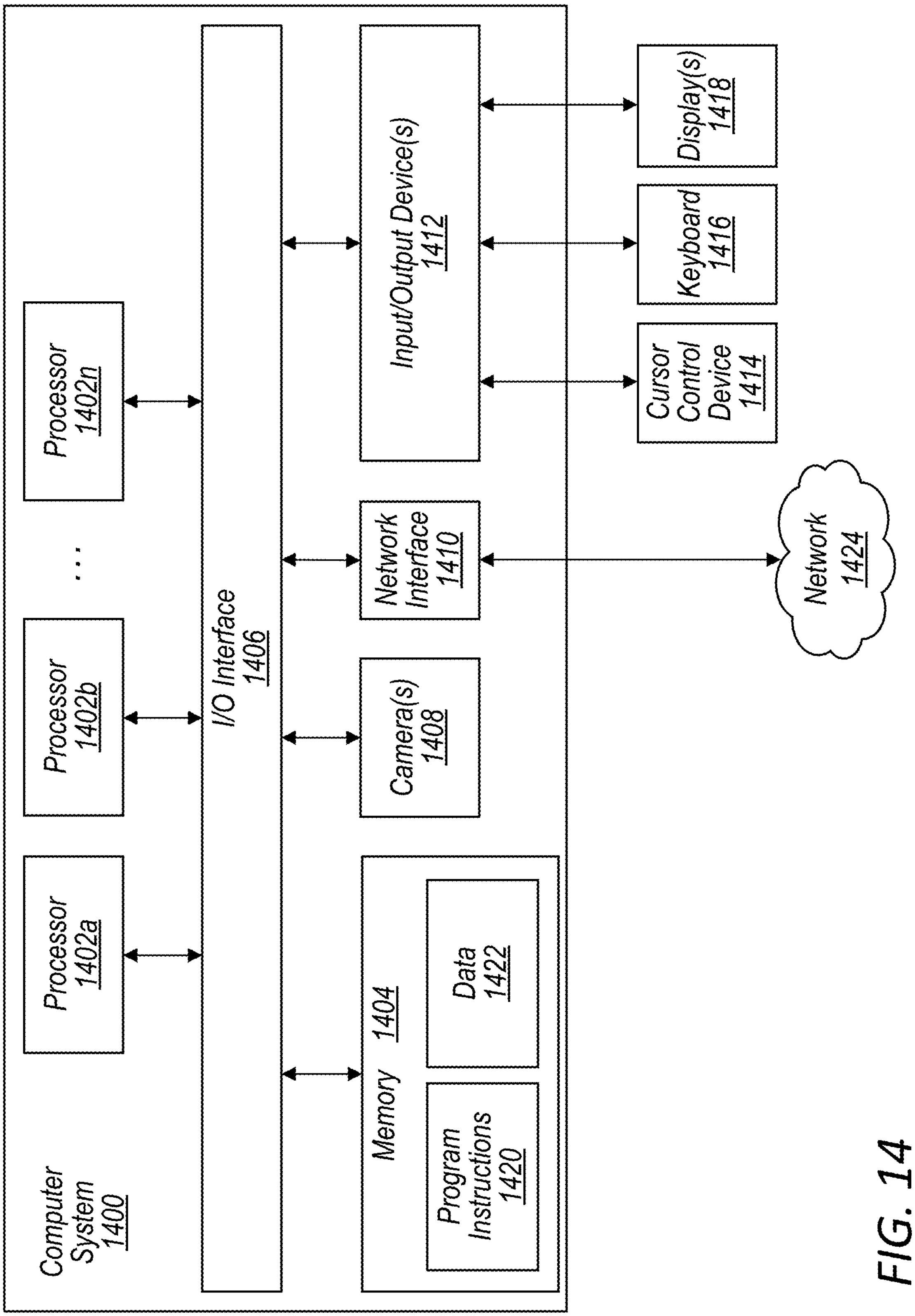
FIG. 14 illustrates a schematic block diagram of an example environment comprising a computer system that may include a camera system having one or more SMA actuators, in accordance with some embodiments.

FIG. 14 illustrates a schematic block diagram of an example environment comprising a computer system 1400 that may include a camera system having one or more SMA actuators, e.g., as described herein with reference to FIGS. 1A-13. In addition, computer system 1400 may implement methods for controlling operations of the camera and/or for performing image processing on images captured with the camera. In some embodiments, the device 1300 (described herein with reference to FIG. 13) may additionally, or alternatively, include some or all of the functional components of the described herein.

The computer system 1400 may be configured to execute any or all of the embodiments described above. In different embodiments, computer system 1400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1400 includes one or more processors 1402 coupled to a system memory 1404 via an input/output (I/O) interface 1406. Computer system 1400 further includes one or more cameras 1408 coupled to the I/O interface 1406. Computer system 1400 further includes a network interface 1410 coupled to I/O interface 1406, and one or more input/output devices 1412, such as cursor control device 1414, keyboard 1416, and display(s) 1418. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1402, or a multiprocessor system including several processors 1402 (e.g., two, four, eight, or another suitable number). Processors 1402 may be any suitable processor capable of executing instructions. For example, in various embodiments processors 1402 may be general-purpose or embedded processors implementing any of a variety of instruction set architectures (ISAs), such as the x86, PowerPC, SPARC, or MIPS ISAs, or any other suitable ISA. In multiprocessor systems, each of processors 1402 may commonly, but not necessarily, implement the same ISA.

System memory 1404 may be configured to store program instructions 1420 accessible by processor 1402. In various embodiments, system memory 1404 may be implemented using any suitable memory technology, such as static random access memory (SRAM), synchronous dynamic RAM (SDRAM), nonvolatile/Flash-type memory, or any other type of memory. Additionally, existing camera control data 1422 of memory 1404 may include any of the information or data structures described above. In some embodiments, program instructions 1420 and/or data 1422 may be received, sent, or stored upon different types of computer-accessible media or on similar media separate from system memory 1404 or computer system 1400. In various embodiments, some or all of the functionality described herein may be implemented via such a computer system 1400.

In one embodiment, I/O interface 1406 may be configured to coordinate I/O traffic between processor 1402, system memory 1404, and any peripheral devices in the device, including network interface 1410 or other peripheral interfaces, such as input/output devices 1412. In some embodiments, I/O interface 1406 may perform any necessary protocol, timing, or other data transformations to convert data signals from one component (e.g., system memory 1404) into a format suitable for use by another component (e.g., processor 1402). In some embodiments, I/O interface 1406 may include support for devices attached through various types of peripheral buses, such as a variant of the Peripheral Component Interconnect (PCI) bus standard or the Universal Serial Bus (USB) standard, for example. In some embodiments, the function of I/O interface 1406 may be split into two or more separate components, such as a north bridge and a south bridge, for example. Also, in some embodiments some or all of the functionality of I/O interface 1406, such as an interface to system memory 1404, may be incorporated directly into processors 1402.

Network interface 1410 may be configured to allow data to be exchanged between computer system 1400 and other devices attached to a network 1424 (e.g., carrier or agent devices) or between nodes of computer system 1400. Network 1424 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1410 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 1412 may, in some embodiments, include one or more display terminals, keyboards, keypads, touchpads, scanning devices, voice or optical recognition devices, or any other devices suitable for entering or accessing data by one or more computer systems 1400. Multiple input/output devices 1412 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1410.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens group;
an image sensor;
a voice coil motor (VCM) optical image stabilization (OIS) actuator configured to tilt the lens group, together with the image sensor, about multiple axes orthogonal to an optical axis of the camera; and
a shape memory alloy (SMA) autofocus (AF) actuator, comprising:
a plurality of SMA wires configured to move the lens group, relative to the image sensor, in directions parallel to the optical axis.

2. The camera of claim 1, further comprising:
a lens carrier with which the lens group is coupled;
a magnet holder;
a coil holder;
a substrate with which the image sensor is coupled, wherein the substrate is coupled with the coil holder;
wherein the VCM OIS actuator comprises:
drive magnets coupled with the magnet holder; and
drive coils coupled with the coil holder, wherein a respective drive coil of the drive coils is positioned proximate a respective drive magnet of the drive magnets such that, when driven with electric current, the respective drive coil is capable of electromagnetically interacting with the respective drive magnet to tilt the coil holder, together with the lens carrier, about the multiple axes orthogonal to the optical axis.

3. The camera of claim 2, wherein the plurality of SMA wires are coupled with the lens carrier and the coil holder.

4. The camera of claim 2, further comprising a suspension arrangement configured to:
suspend the lens carrier from the coil holder;
suspend the coil holder from the magnet holder;
suspend the substrate from a base structure of the camera; and
allow motion of the lens group and the image sensor enabled by the VCM OIS actuator and the SMA AF actuator.

5. The camera of claim 4, wherein the suspension arrangement comprises:
an upper spring coupled with the lens carrier and the coil holder, so as to suspend the lens carrier from the coil holder;
a lower spring coupled with the coil holder and magnet holder, so as to suspend the coil holder from the magnet holder; and
a flexure coupled with the substrate and the base structure, so as to suspend the substrate from the base structure.

6. The camera of claim 4, wherein the suspension arrangement comprises a ball bearing suspension arrangement.

7. The camera of claim 1, wherein the OIS actuator comprises an SMA OIS actuator that includes another plurality of SMA wires.

8. A device, comprising:
one or more processors;
memory storing program instructions executable by the one or more processors to control operations of a camera; and
the camera, comprising:
a lens group;
an image sensor;
a voice coil motor (VCM) optical image stabilization (OIS) actuator configured to tilt the lens group, together with the image sensor, about multiple axes orthogonal to an optical axis of the camera; and
a shape memory alloy (SMA) autofocus (AF) actuator, comprising:
a plurality of SMA wires configured to move the lens group, relative to the image sensor, in directions parallel to the optical axis.

9. The device of claim 8, wherein the camera further comprises:
a lens carrier with which the lens group is coupled;
a magnet holder;
a coil holder;
a substrate with which the image sensor is coupled, wherein the substrate is coupled with the coil holder;
wherein the VCM OIS actuator comprises:
drive magnets coupled with the magnet holder; and
drive coils coupled with the coil holder, wherein a respective drive coil of the drive coils is positioned proximate a respective drive magnet of the drive magnets such that, when driven with electric current, the respective drive coil is capable of electromagnetically interacting with the respective drive magnet to tilt the coil holder, together with the lens carrier, about the multiple axes orthogonal to the optical axis.

10. The device of claim 9, wherein the plurality of SMA wires are coupled with the lens carrier and the coil holder.

11. The device of claim 9, further comprising a suspension arrangement configured to:
suspend the lens carrier from the coil holder;
suspend the coil holder from the magnet holder;
suspend the substrate from a base structure of the camera; and
allow motion of the lens group and the image sensor enabled by the VCM OIS actuator and the SMA AF actuator.

12. The device of claim 11, wherein the suspension arrangement comprises:
an upper spring coupled with the lens carrier and the coil holder, so as to suspend the lens carrier from the coil holder;
a lower spring coupled with the coil holder and magnet holder, so as to suspend the coil holder from the magnet holder; and
a flexure coupled with the substrate and the base structure, so as to suspend the substrate from the base structure.

13. The device of claim 12, wherein the suspension arrangement further comprises a ball bearing suspension arrangement.

14. The device of claim 8, wherein the OIS actuator comprises an SMA OIS actuator that includes another plurality of SMA wires.

15. A system, comprising:
a voice coil motor (VCM) optical image stabilization (OIS) actuator configured to tilt a lens group of a camera, together with an image sensor of the camera, about multiple axes orthogonal to an optical axis of the camera; and a shape memory alloy (SMA) autofocus (AF) actuator, comprising:

a plurality of SMA wires configured to move the lens group, relative to the image sensor, in directions parallel to the optical axis.

16. The system of claim 15, further comprising:

a lens carrier with which the lens group is coupled;

a magnet holder;

a coil holder;

a substrate with which the image sensor is coupled, wherein the substrate is coupled with the coil holder;

wherein the VCM OIS actuator comprises:

drive magnets coupled with the magnet holder; and drive coils coupled with the coil holder, wherein a respective drive coil of the drive coils is positioned proximate a respective drive magnet of the drive magnets such that, when driven with electric current, the respective drive coil is capable of electromagnetically interacting with the respective drive magnet to tilt the coil holder, together with the lens carrier, about the multiple axes orthogonal to the optical axis.

17. The system of claim 16, wherein the plurality of SMA wires are coupled with the lens carrier and the coil holder.

* * * * *